(12) United States Patent
Lev-Tov et al.

(10) Patent No.: US 10,896,395 B2
(45) Date of Patent: Jan. 19, 2021

(54) SYSTEM AND METHOD FOR AUTOMATIC QUALITY MANAGEMENT AND COACHING

(71) Applicant: Genesys Telecommunications Laboratories, Inc., Daly City, CA (US)

(72) Inventors: Amir Lev-Tov, Bat-Yam (IL); Tamir Tapuhi, Ramat-Gan (IL); Avraham Faizakof, Kfar-Warburg (IL); David Konig, Tel Aviv (IL); Yochai Konig, San Francisco, CA (US)

( * ) Notice: Subject to any disclaimer, the term of this patent is extended or adjusted under 35 U.S.C. 154(b) by 406 days.

(21) Appl. No.: 15/282,897

(22) Filed: Sep. 30, 2016

(65) Prior Publication Data

US 2018/0096278 A1 Apr. 5, 2018

(51) Int. Cl.
| | |
|---|---|
| *G06Q 10/06* | (2012.01) |
| *G06Q 10/10* | (2012.01) |
| *G10L 15/26* | (2006.01) |
| *G10L 15/22* | (2006.01) |
| *G10L 15/18* | (2013.01) |
| *G06F 16/9535* | (2019.01) |

(52) U.S. Cl.
CPC ... *G06Q 10/06395* (2013.01); *G06F 16/9535* (2019.01); *G06Q 10/1095* (2013.01); *G10L 15/22* (2013.01); *G10L 2015/228* (2013.01)

(58) Field of Classification Search
CPC ......... G06Q 10/06; G06Q 00/00–99/00; G06F 1/00–40/00; G10L 13/00–99/00
USPC ............................................... 705/7.11–7.42
See application file for complete search history.

(56) References Cited

U.S. PATENT DOCUMENTS

| | | |
|---|---|---|
| 6,234,806 B1 | 5/2001 | Trenholm |
| 8,943,002 B2 | 1/2015 | Zelenko et al. |
| 9,672,196 B2 | 6/2017 | Shachar et al. |
| 2006/0265090 A1 | 11/2006 | Conway |
| 2008/0313090 A1 | 12/2008 | Portman et al. |

(Continued)

FOREIGN PATENT DOCUMENTS

CA 2564003 A1 * 4/2007

OTHER PUBLICATIONS

Lobo, S.R. & Ramanathan, Krishnamurthy. (2005). Information and communication technology supported total quality management. Portland International Conference on Management of Engineering and Technology. 2005. 310-320. 10.1109/PICMET.2005.1509706. (Year: 2005).*

(Continued)

*Primary Examiner* — Alan S Miller
*Assistant Examiner* — Jay-Ming Wang

(57) ABSTRACT

A method includes: receiving, by a processor, an evaluation form including a plurality of evaluation questions; receiving, by the processor, an interaction to be evaluated by the evaluation form; selecting, by the processor, an evaluation question of the evaluation form, the evaluation question including a rule associated with one or more topics, each of the topics including one or more words or phrases; searching, by the processor, the interaction for the one or more topics of the rule in accordance with the presence of one or more words or phrases in the interaction to generate a search result; calculating, by the processor, an answer to the evaluation question in accordance with the rule and the search result; and outputting, by the processor, the calculated answer to the evaluation question of the evaluation form.

16 Claims, 17 Drawing Sheets

(56) References Cited

U.S. PATENT DOCUMENTS

| | | | | |
|---|---|---|---|---|
| 2009/0234720 | A1* | 9/2009 | George | G06Q 10/06 705/7.42 |
| 2009/0253112 | A1 | 10/2009 | Cao et al. | |
| 2012/0072254 | A1* | 3/2012 | McLean | G06Q 10/0631 14 705/7.14 |
| 2012/0253825 | A1* | 10/2012 | Di Fabbrizio | G06F 40/58 704/275 |
| 2013/0297625 | A1 | 11/2013 | Bierner et al. | |
| 2014/0065591 | A1* | 3/2014 | Tulgan | G09B 5/08 434/350 |
| 2014/0143157 | A1 | 5/2014 | Jeffs et al. | |
| 2014/0314225 | A1 | 10/2014 | Riahi et al. | |
| 2016/0092894 | A1 | 3/2016 | Lu et al. | |
| 2016/0350699 | A1* | 12/2016 | Vymenets | G06Q 10/0639 8 |
| 2017/0006161 | A9 | 1/2017 | Riahi et al. | |
| 2018/0096617 | A1 | 4/2018 | Tapuhi et al. | |

OTHER PUBLICATIONS

Berant, et al. "Semantic Parsing on Freebase from Question-Answer Pairs," *EMNLP*. vol. 2. No. 5., 2013, (12 pages).

Mikolov, et al. "Distributed Representations of Words and Phrases and their Compositionality," *Advances in neural information processing systems*. 2013, (9 pages).

U.S. Appl. No. 13/952,459 "System and Method for Discovering and Exploring Concepts," filed in the United States Patent and Trademark Office on Jul. 26, 2013 (43 pages).

U.S. Appl. No. 14/327,476 "System and Method for Semantically Exploring Concepts," filed in the United States Patent and Trademark Office on Jul. 9, 2014 (47 pages).

U.S. Appl. No. 14/586,730 "System and Method for Interactive Multi-Resolution Topic Detection and Tracking," filed in the United States Patent and Trademark Office on Dec. 30, 2014 (52 pages).

U.S. Appl. No. 14/726,491 "System and Method for Quality Management Platform," filed in the United States Patent and Trademark Office on May 30, 2015 (36 pages).

U.S. Appl. No. 15/133,188 "Quality Monitoring Automation in Contact Centers," filed in the United States Patent and Trademark Office on Apr. 19, 2016 (55 pages).

International Search Report and Written Opinion for Application No. PCT/US2017/053779, dated Apr. 16, 2018, 17 pages.

\* cited by examiner

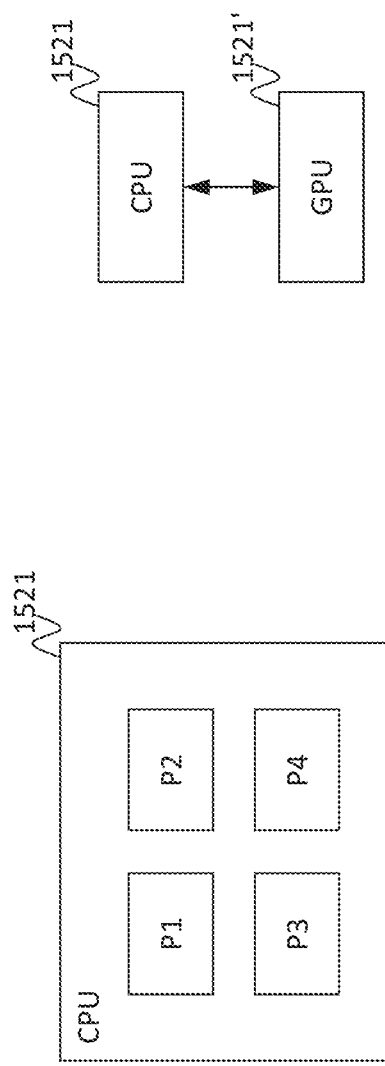

SYSTEM AND METHOD FOR AUTOMATIC QUALITY MANAGEMENT AND COACHING

FIELD

Aspects of embodiments of the present invention relate to the field of software for operating contact centers, in particular, software for performing speech recognition and analytics on voice interactions occurring in a contact center and for monitoring and controlling the operation of the contact center in accordance with the analytics.

BACKGROUND

Generally, a contact center is staffed with agents who serve as an interface between an organization, such as a company, and outside entities, such as customers. For example, human sales agents at contact centers may assist customers in making purchasing decisions and may receive purchase orders from those customers. Similarly, human support agents at contact centers may assist customers in resolving issues with products or services provided by the organization. Interactions between contact center agents and outside entities (customers) may be conducted by voice (e.g., telephone calls or voice over IP or VoIP calls), video (e.g., video conferencing), text (e.g., emails and text chat), or through other media.

Quality monitoring in contact centers refers to the process of evaluating agents and ensuring that the agents are providing sufficiently high quality service. Generally, a quality monitoring process will monitor the performance of an agent by evaluating the interactions that the agent participated in for events such as whether the agent was polite and courteous, whether the agent was efficient, and whether the agent proposed the correct solutions to resolve a customer's issue.

SUMMARY

Aspects of embodiments of the present invention are directed to systems and methods for automatically monitoring, evaluating, and managing the performance of agents of a contact center.

According to one embodiment of the present invention, a method includes: receiving, by a processor, an evaluation form including a plurality of evaluation questions; receiving, by the processor, an interaction to be evaluated by the evaluation form; selecting, by the processor, an evaluation question of the evaluation form, the evaluation question including a rule associated with one or more topics, each of the topics including one or more words or phrases; searching, by the processor, the interaction for the one or more topics of the rule in accordance with the presence of one or more words or phrases in the interaction to generate a search result; calculating, by the processor, an answer to the evaluation question in accordance with the rule and the search result; and outputting, by the processor, the calculated answer to the evaluation question of the evaluation form.

The method may further include: determining whether the calculated answer triggers a coaching rule of a plurality of coaching rules, the coaching rule corresponding to the evaluation question; and generating a notification in accordance with the answer to the evaluation question.

The generating the notification may include identifying, based on the calculated answer, a coaching tip from a plurality of coaching tips associated with the coaching rule, and the notification may include the coaching tip.

The generating the notification may occur in real-time during the interaction.

The interaction may be a voice interaction, the method may further include supplying the voice interaction to an automatic speech recognition engine to generate a speech recognition output, and the detecting the one or more detected topics in the interaction may include identifying one or more instances of the one or more topics in the speech recognition output.

According to one embodiment of the present invention, a method for generating a customized coaching session for an agent includes: receiving, by a processor, one or more evaluations of interactions involving the agent, each of the evaluations being computed based on an evaluation form and an interaction, the evaluation form including a plurality of evaluation questions, the evaluation including a plurality of answers corresponding to the evaluation questions; computing, by the processor, one or more aggregated quality metrics in accordance with the answers of the one or more evaluations; comparing, by the processor, each of the one or more aggregated quality metrics against corresponding threshold values; identifying, by the processor, one or more underperforming quality metrics in accordance with the comparisons of the aggregated quality metrics with the threshold values; generating, by the processor, the customized coaching session in accordance with the identified one or more underperforming quality metrics; and outputting, by the processor, the customized coaching session.

The method may further include, for each of the one or more underperforming quality metrics, identifying portions of the interactions corresponding to the answer corresponding to the evaluation question; and adding the identified portions to the customized coaching session.

The method may further include: identifying one or more previous customized coaching sessions generated for the agent, each including a timestamp and one or more coaching session reasons; grouping the one or more previous customized coaching sessions by coaching session reason; computing an average interval between coaching sessions having the same coaching session reason; and scheduling a customized coaching session for the agent in accordance with the computed average interval.

According to one embodiment of the present invention, a method for automatic monitoring of performance trends based on evaluations of all agents includes: receiving, by a processor, a plurality of evaluations involving a plurality of different agents, each of the evaluations including one or more quality metrics; comparing, by the processor, each of the one or more quality metrics with a corresponding threshold value; identifying, by the processor, a metric of the one or more quality metrics that fails to meet the corresponding threshold value; calculating, by the processor, a level of correlation of the metric between agents; identifying, by the processor, the metric as being an individual metric when the correlation is low; identifying, by the processor, the metric as being a group metric when the correlation is high; identifying, by the processor, a process issue corresponding to the metric when substantially all of the agents fail to meet the corresponding threshold value with respect to the metric; and outputting, by the processor, a classification of the metric in accordance with the individual metric, the group metric, and the process issue.

According to one embodiment, a system includes: a processor; memory storing instructions that, when executed by the processor, cause the processor to: receive an evaluation form including a plurality of evaluation questions; receive an interaction to be evaluated by the evaluation form; select an evaluation question of the evaluation form, the evaluation question including a rule associated with one or more topics, each of the topics including one or more words or phrases; search the interaction for the one or more topics of the rule in accordance with the presence of one or more words or phrases in the interaction to generate a search result; calculate an answer to the evaluation question in accordance with the rule and the search result; and output the calculated answer to the evaluation question of the evaluation form.

The memory may further store instructions that, when executed by the processor, cause the processor to: determine whether the calculated answer triggers a coaching rule of a plurality of coaching rules, the coaching rule corresponding to the evaluation question; and generate a notification in accordance with the answer to the evaluation question.

The memory may further store instructions that, when executed by the processor, cause the processor to generate the notification by identifying, based on the calculated answer, a coaching tip from a plurality of coaching tips associated with the coaching rule, and the notification may include the coaching tip.

The memory may further store instructions that, when executed by the processor, cause the processor to generate the notification in real-time during the interaction.

The interaction may be a voice interaction, the memory may further store instructions that, when executed by the processor, cause the processor to supply the voice interaction to an automatic speech recognition engine to generate a speech recognition output, and the memory may further store instructions that, when executed by the processor, cause the processor to detect the one or more detected topics in the interaction by identifying one or more instances of the one or more topics in the speech recognition output.

According to one embodiment of the present invention, a system includes: a processor; memory storing instructions that, when executed by the processor, cause the processor to generate a customized coaching session for an agent by: receiving one or more evaluations of interactions involving the agent, each of the evaluations being computed based on an evaluation form and an interaction, the evaluation form including a plurality of evaluation questions, the evaluation including a plurality of answers corresponding to the evaluation questions; computing one or more aggregated quality metrics in accordance with the answers of the one or more evaluations; comparing each of the one or more aggregated quality metrics against corresponding threshold values; identifying one or more underperforming quality metrics in accordance with the comparisons of the aggregated quality metrics with the threshold values; generating the customized coaching session in accordance with the identified one or more underperforming quality metrics; and outputting the customized coaching session.

The memory may further stores instructions that, when executed by the processor, cause the processor to, for each of the one or more underperforming quality metrics: identify portions of the interactions corresponding to the answer corresponding to the evaluation question; and add the identified portions to the customized coaching session.

The memory may further store instructions that, when executed by the processor, cause the processor to: identify one or more previous customized coaching sessions generated for the agent, each including a timestamp and one or more coaching session reasons; group the one or more previous customized coaching sessions by coaching session reason; compute an average interval between coaching sessions having the same coaching session reason; and schedule a customized coaching session for the agent in accordance with the computed average interval.

According to one embodiment of the present invention, a system includes: a processor; memory storing instructions that, when executed by the processor, cause the processor to: receive a plurality of evaluations involving a plurality of different agents, each of the evaluations including one or more quality metrics; compare each of the one or more quality metrics with a corresponding threshold value; identify a metric of the one or more quality metrics that fails to meet the corresponding threshold value; calculate a level of correlation of the metric between agents; identify the metric as being an individual metric when the correlation is low; identify the metric as being a group metric when the correlation is high; identify a process issue corresponding to the metric when substantially all of the agents fail to meet the corresponding threshold value with respect to the metric; and output a classification of the metric in accordance with the individual metric, the group metric, and the process issue.

BRIEF DESCRIPTION OF THE DRAWINGS

The accompanying drawings, together with the specification, illustrate exemplary embodiments of the present invention, and, together with the description, serve to explain the principles of the present invention.

FIG. 12C is a block diagram of a computing device according to an embodiment of the present invention.

FIG. 12D is a block diagram of a computing device according to an embodiment of the present invention.

DETAILED DESCRIPTION

Quality monitoring (QM) in a contact center refers to the process of evaluating agents to measure and ensure the quality of the service provided by the human agents. Typically, quality monitoring is performed to measure agent performance during interactions (e.g., calls, text chats, and email exchanges) between the agents and customers, such as whether the agent was polite and courteous, and to measure agent effectiveness, such as whether the agent was able to resolve the customer's issue and whether the agent was time efficient in doing so.

Systems for quality monitoring or quality management are described in U.S. patent application Ser. No. 14/726,491 "System and Method for Quality Management Platform," filed in the United States Patent and Trademark Office on May 30, 2015, and in U.S. patent application Ser. No. 15/133,188 "Quality Monitoring Automation in Contact Centers," filed in the United States Patent and Trademark Office on Apr. 19, 2016, the entire disclosures of which are incorporated by reference herein.

Broadly, performing quality monitoring and coaching according to one embodiment of the present invention broadly involves: automatically evaluating individual interactions in accordance with defined quality criteria; automatically providing feedback to the agent based on those evaluations, whether in real-time during the interaction or after the interaction; providing customized training to the agent based on the evaluations; automatically monitoring performance trends among the agents; and automatically calculating evaluation scores of individual interactions. These various components allow an organization to monitor and improve the performance of its contact center in a way that is substantially automatic, while still retaining the ability to monitor performance. These various aspects of embodiments of the present invention will be described in more detail below.

Contact Center Overview

Figure 1:
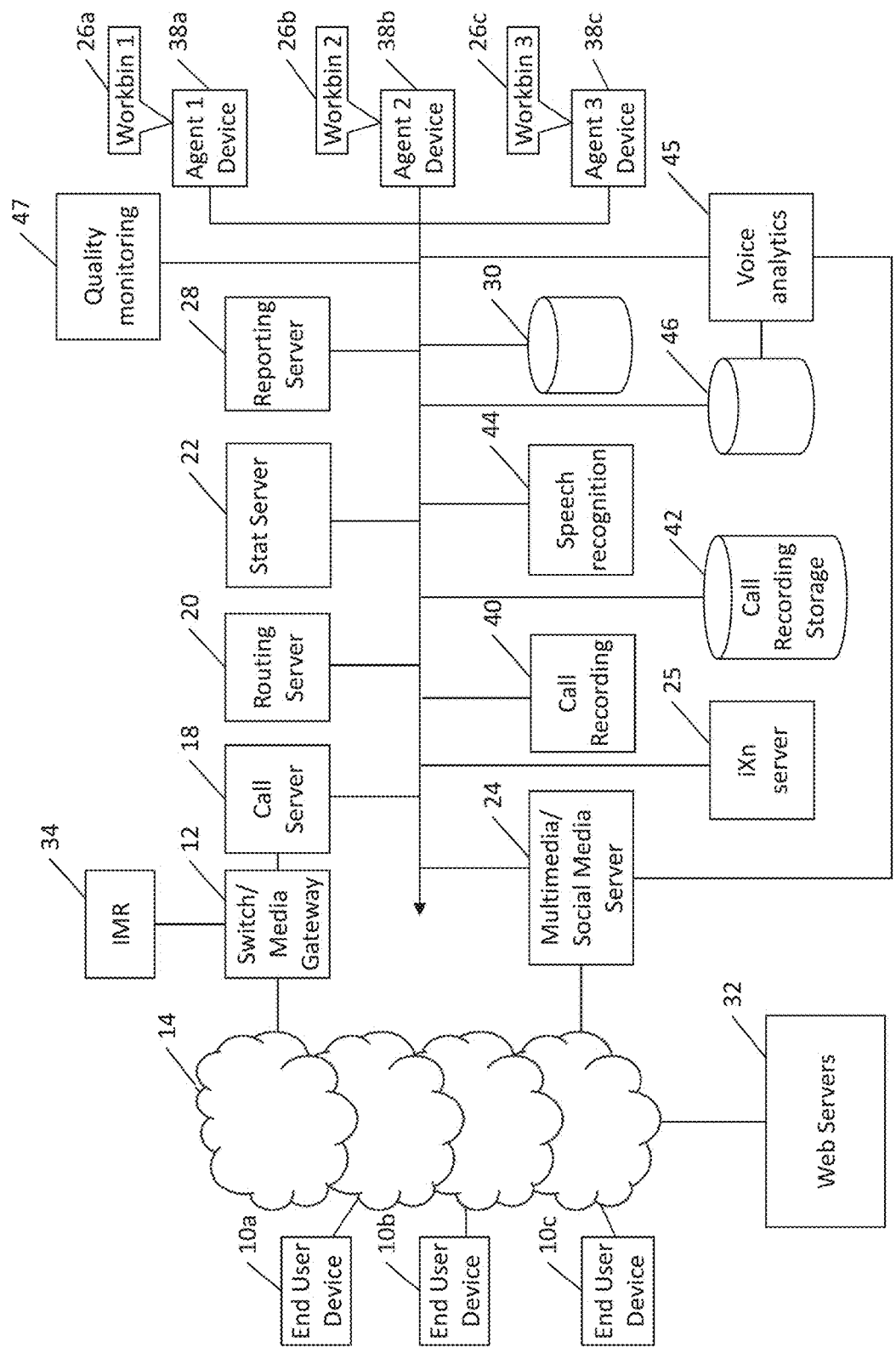
FIG. 1 is a schematic block diagram of a system for supporting a contact center in providing contact center services according to one exemplary embodiment of the invention.

FIG. 1 is a schematic block diagram of a system for supporting a contact center in providing contact center services according to one exemplary embodiment of the invention. For the purposes of the discussion herein, interactions between customers using end user devices 10 and agents at a contact center using agent devices 38 may be recorded by call recording module 40 and stored in call recording storage 42. The recorded calls may be processed by speech recognition module 44 to generate recognized text which is stored in recognized text storage 46. In some embodiments of the present invention, a voice analytics system 45 configured to perform analytics on recognized speech data such as by detecting events occurring in the interactions and categorizing the interactions in accordance with the detected events. Aspects of speech analytics systems are described, for example, in U.S. patent application Ser. No. 14/586,730 "System and Method for Interactive Multi-Resolution Topic Detection and Tracking," filed in the United States Patent and Trademark Office on Dec. 30, 2014, the entire disclosure of which is incorporated herein by reference. Embodiments of the present invention may also include a quality monitoring (QM) system 47, which will be described in more detail below.

The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one exemplary embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound telephony calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound telephony calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, or any wireless network/technology conventional in the art, including but to limited to 3G, 4G, LTE, and the like.

According to one exemplary embodiment, the contact center includes a switch/media gateway 12 coupled to the communications network 14 for receiving and transmitting telephony calls between end users and the contact center. The switch/media gateway 12 may include a telephony switch configured to function as a central switch for agent level routing within the center. The switch may be a hardware switching system or a soft switch implemented via software. For example, the switch 12 may include an automatic call distributor, a private branch exchange (PBX), an IP-based software switch, and/or any other switch configured to receive Internet-sourced calls and/or telephone network-sourced calls from a customer, and route those calls to, for example, an agent telephony device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call server 18 which may, for example, serve as an adapter or interface between the switch and the remainder of the routing, monitoring, and other call-handling components of the contact center.

The call server 102 may be configured to process PSTN calls, VoIP calls, and the like. For example, the call server 102 may include a session initiation protocol (SIP) server for processing SIP calls. According to some exemplary embodiments, the call server 102 may, for example, extract data about the customer interaction such as the caller's telephone number, often known as the automatic number identification (ANI) number, or the customer's internet protocol (IP) address, or email address, and communicate with other CC components and/or CC iXn controller 18 in processing the call.

According to one exemplary embodiment of the invention, the system further includes an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How may I assist you?" and the customer may speak or otherwise enter a reason for contacting the contact center. The customer's speech may then be processed by the speech recognition module 44 and the customer's response may then be used by the routing server 20 to route the call to an appropriate contact center resource.

In more detail, a speech driven IMR receives audio containing speech from a user. The speech is then processed to find phrases and the phrases are matched with one or more speech recognition grammars to identify an action to take in response to the user's speech. As used herein, the term "phrases" may also include "fragments" in which words are extracted from utterances that are not necessarily sequential. As such, the term "phrase" includes portions or fragments of transcribed utterances that omit some words (e.g., repeated words and words with low saliency such as "um" and "ah"). For example, if a user says "what is my account balance?" then the speech driven IMR may attempt to match phrases detected in the audio (e.g., the phrase "account balance") with existing grammars associated with actions such as account balance, recent transactions, making payments, transferring funds, and connecting to a human customer service agent. Each grammar may encode a variety of ways in which customers may request a particular action. For example, an account balance request may match phrases such as "account balance," "account status," "how much money is in my accounts," and "what is my balance." Once a match between the spoken phrase from the user and a grammar is detected, the action associated with the grammar is performed in a manner similar to the receiving a user selection of an action through a keypress. These actions may include, for example, a VoiceXML response that is dynamically generated based on the user's request and based on stored business information (e.g., account balances and transaction records).

In some embodiments, the speech recognition module 44 may also operate during a voice interaction between a customer and a live human agent in order to perform analytics on the voice interactions. During a voice interaction, audio containing speech from the customer and speech from the human agent (e.g., as separate audio channels or as a combined audio channel) may be processed by the speech recognition module 44 to identify words and phrases uttered by the customer and/or the agent during the interaction. In some embodiments of the present invention, a different speech recognition modules are used for the IMR and for performing voice analytics of the interactions (e.g., the speech recognition module may be configured differently for the IMR as compared to the voice interactions, due, or example, to differences in the range of different types of phrases expected to be spoken in the two different contexts).

In some embodiments, the routing server 20 may query a customer database, which stores information about existing clients, such as contact information, service level agreement (SLA) requirements, nature of previous customer contacts and actions taken by contact center to resolve any customer issues, and the like. The database may be, for example, Cassandra or any non-SQL database, and may be stored in a mass storage device 30. The database may also be a SQL database an may be managed by any database management system such as, for example, Oracle, IBM DB2, Microsoft SQL server, Microsoft Access, PostgreSQL, MySQL, FoxPro, and SQLite. The routing server 20 may query the customer information from the customer database via an ANI or any other information collected by the IMR server 34.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 30 or elsewhere. The mass storage device may take form of a hard disk or disk array as is conventional in the art.

Automatic Evaluation of Interactions

Aspects of embodiments of the present invention are directed to automatically aspects of embodiments of the present invention, the quality monitoring system 47 automatically evaluates individual interactions in accordance with defined quality criteria.

The quality criteria can be defined by a form developer, such as a person who manages a team of agents at a contact center. The manager may author an evaluation form using techniques described in, for example, U.S. patent application Ser. No. 15/133,188 "Quality Monitoring Automation in Contact Centers," filed in the United States Patent and Trademark Office on Apr. 19, 2016, the entire disclosure of which are incorporated by reference herein, where answers to the questions in the evaluation form represent evaluation of the interaction against the defined quality criteria.

An evaluation form includes one or more questions that relate to an agent's performance during an interaction, such as "did the agent present himself?" and "was the agent attentive?" The form developer may also set the data types of the answers to the questions, e.g., whether the answers are: a yes/no data type ("yes" or "no"); a multiple response data type (a multiple choice question); numerical value data type (e.g., on a scale from 1 to 10); or free text data type (e.g., a free written response). In addition, portions of the evaluation form may automatically be presented or not presented (e.g., automatically hidden or shown) based on a condition. For example, if the particular interaction being evaluated included an "escalation request" (e.g., as identified by an evaluator or by the agent) the form may be automatically populated with the question "how did the agent handle the escalation request?"

The various questions of the evaluation form are with various quality criteria. For example, questions such as "was the agent attentive?" and "did the agent use profanity?" may relate to the criteria of "agent sociability."

In comparative quality monitoring systems, human evaluators review interactions and manually answer the questions on the evaluation form. For example, the human evaluators may read chat transcripts and/or listen to recorded audio from the interactions between agents and customers. Due to the time and expense required for manual evaluation of the interactions, generally speaking, only a small fraction of all interactions (e.g., 1% to 2%) are evaluated, where these interactions may be selected randomly or selected based various criteria. As a result, in these comparative systems, agents receive feedback based on only a very small sample of their actual work, and it may be difficult to obtain information about general trends and the quality of agent performance within a contact center.

As described in U.S. patent application Ser. No. 15/133,188 "Quality Monitoring Automation in Contact Centers," a quality monitoring system is capable of automatically filling in answers to at least some portions of the evaluation form based on an automatic analysis of the interaction. In one embodiment, each question of the evaluation form is associated with one or more answers. For example, the question may be a "yes or no" question, a multiple choice questions, ora rating on a scale (e.g., from 1 to 10). In addition, each of the answers is associated with one or more "topics." Detecting a topic within an interaction can be used as support or evidence that a particular answer to the question is appropriate.

Broadly, a "topic" refers to a concept or event that occurred in an interaction. A topic may be constructed from one or more phrases and interactions that contain those phrases can be identified as relating to that topic. For example, a topic called "delinquency" may include the phrases: "delinquent balance," "past due," "delinquency notice," and "set up payment arrangement." As another example, a topic called "profanity" may include a number of phrases that are understood to be inappropriate for use by an agent in a professional interaction. Detecting any of the phrases within an interaction (e.g., within a speech-to-text transcript of a voice interaction or based on matching the text within the transcript of a text-based chat session) can identify the section containing the phrases as relating to the associated topic. Topics can be grouped together into "meta topics" and meta topics may be grouped with other meta topics and/or topics to form a semantic hierarchy or taxonomy of meta topics and topics.

Additional detail regarding analytics systems and methods for automatically detecting and tracking topics can be found, for example, in: U.S. patent application Ser. No. 13/952,459 "System and Method for Discovering and Exploring Concepts," filed in the United States Patent and Trademark Office on Jul. 26, 2013; U.S. patent application Ser. No. 14/327,476 "System and Method for Semantically Exploring Concepts," filed in the United States Patent and Trademark Office on Jul. 9, 2014; and U.S. patent application Ser. No. 14/586,730 "System and Method for Interactive Multi-Resolution Topic Detection and Tracking," filed in the United States Patent and Trademark Office on Dec. 30, 2014, the entire disclosures of which are incorporated by reference herein. In the context of a voice interaction, an automatic speech recognition engine may be used to transform audio data into voice recognition output (e.g., Large Vocabulary Continuous Speech Recognition or LVCSR output or text output), which may be analyzed to detect the topics.

Therefore, as described in U.S. patent application Ser. No. 15/133,188 "Quality Monitoring Automation in Contact Centers," each of the questions can be associated with one or more "topics," where the detection of a topic within an interaction or a portion of an interaction can be used to answer a particular question. For example, a question such as "did the agent use profanity" can be answered "yes" or "no" in accordance with whether or not the topic "profanity" was detected within the interaction. As another example, a question such as "did the agent take ownership of the problem" can be answered in accordance with whether or not the "assume ownership" topic was detected, which may include a phrase such as "sorry, that was our mistake."

Furthermore, as discussed in U.S. patent application Ser. No. 15/133,188 "Quality Monitoring Automation in Contact Centers," particular portions of the interactions containing the answers to the questions can be automatically identified. For example, as evidence of the presence of the "ownership," the portion of the interaction during which the agent spoke the phrase can be automatically identified and played back to a user.

As such, embodiments of the present invention enable at least some evaluation questions to be automatically answered by detecting the presence of one or more topics within an interaction.

Figure 2:
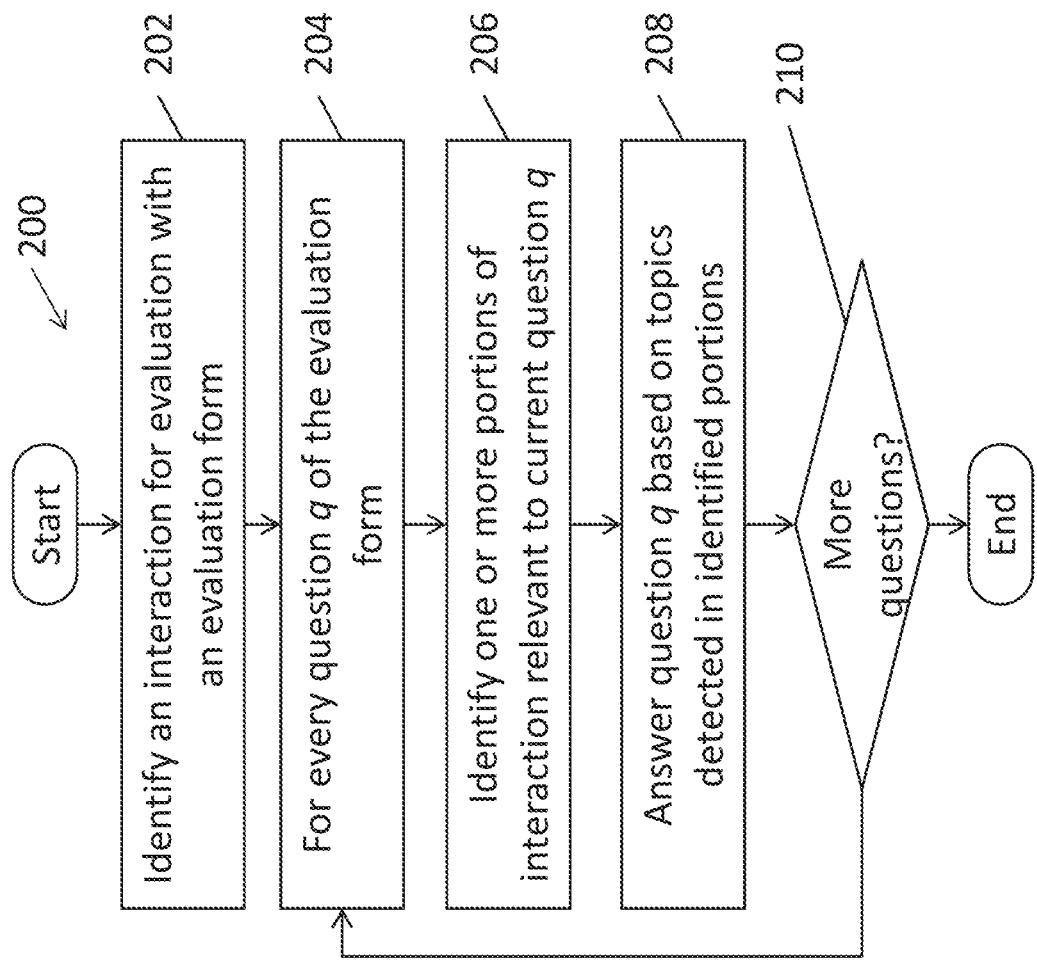
FIG. 2 is a flowchart of a method according to one embodiment of the present invention for automatically answering questions of an evaluation form.

FIG. 2 is a flowchart of a method 200 according to one embodiment of the present invention for automatically answering questions of an evaluation form. In operation 202, an interaction for evaluation is identified, along with an evaluation form to use to evaluate the interaction. For each question q of the evaluation form (operation 204), in operation 206 the quality monitoring system 47 identifies one or more portions of the interaction that are relevant to the question q. This identification of relevant portions may include, for example identifying portions that correspond to a topic that is associated with the question q. As a more specific example, if the question q is "did the agent use profanity?" then the topic may be the "profanity" topic and the identified portions of the interaction are portions that include one or more phrases belonging to the "profanity" topic.

In operation 208, the quality monitoring system 47 answers the question q based on the topics detected in the identified portions, or the lack of such identified portions. For example, the failure to find any portions of the interaction corresponding to the "profanity" topic can be treated as evidence that the answer to the question "did the agent use profanity?" to be "no." On the other hand, finding portions corresponding to profanity would cause the automatically determined answer to be "yes."

The quality monitoring system 47 may also store the identified portions. This may include, for example, storing the locations of the identified portions within the interactions (e.g., start and end timestamps or other identifiers).

In operation 210, the quality monitoring system 47 determines if there are more answers to evaluate. If so, then the process returns to operation 204, where the next question q from the evaluation form is selected.

The automatic analysis of interactions to answer questions of the evaluation form 200 can be done after the completion of the interaction or may be performed in real-time during the interaction. In embodiments where the automatic analysis is performed after the completion of the interaction, the entire interaction can be searched for relevant portions in operation 206. In embodiments where the automatic analysis in performed during the interaction, the quality monitoring system 47 may continuously analyze the content of the interaction available so far. For example, only the portions of the interaction from the start until the current time or from the time of the last analysis until the current time (e.g., a few seconds) are analyzed to identify whether one or more events or topics corresponding to answers to any of the questions have occurred in the interaction.

While a quality monitoring system 47 may be able to answer some types off questions automatically, other types of questions may require a human evaluator to manually answer those questions. Questions that can be answered automatically may generally relate to the presence or absence of particular phrases in the interaction. On the other hand, questions that need to be answered manually may require more qualitative evaluations of the interaction, such as whether the agent was effective at establishing rapport with the customer or whether the agent used a calm and caring tone of voice, which may be more difficult to automatically determine.

Automatically Providing Feedback to the Agents

Aspects of embodiments of the present invention relate to automatically providing feedback to the agents based on the automatic evaluations. In various embodiments, the feedback may be provided in real-time during the interaction or may be provided after the interaction.

As discussed above, aspects of embodiments of the present invention relate to the process of applying automatic quality monitoring to automatically evaluate an interaction in accordance with various quality metrics or key performance indicators (KPIs). These quality metrics may be provided as feedback to the agents in order to congratulate the agent on quality metrics of the interaction that were positive, and in order to provide advice or tips on improving aspects of the interaction that were negative.

The term "coaching" is used herein to refer to the process of guiding an agent in order to improve the agent's performance and efficiency when interacting with customers based on the quality metrics. The term "real-time coaching" is used herein to refer to the process of doing coaching in real-time during a live interaction. In the context of embodiments of the present invention, the "real-time coaching" is performed automatically based on the quality metrics that are automatically computed during a real-time automatic quality evaluation of the interaction.

In addition, aspects of embodiments of the present invention relate to quality monitoring gamification, in which tips, feedback, and scores may be presented in real time or offline in order to encourage continuous improvement.

Automatic Real-Time Coaching

Aspects of embodiments of the present invention apply automatic quality monitoring during an interaction to provide real-time feedback on the ongoing behavior of the agent, and can supply guidance for the rest of the interaction.

For example, a quality monitoring evaluation form may include the question: "Did the agent communicate in positive terms, e.g., what we can do for the consumer rather than state what cannot do?"

Under typical conditions, if an agent communicated with a customer in negative terms during an interaction, such as by saying "sorry, we can't help you with that," the particular interaction might not ever be evaluated by a human evaluator, and, even if it was reviewed, the agent might receive corrective feedback at a much later time, such as days or weeks after the event.

However, with the addition of automatic quality monitoring of every interaction, it is possible to immediately detect the use of negative phrasing during a call and to provide a real-time alert to the agent to refrain from using words and phrases such as "unfortunately," "I can't," "we don't," and the like. This notification may be displayed, for example, as a pop-up balloon or an alert on the agent's device 38.

As another example, an evaluation question may be: "Did the agent communicate an ownership statement to let the consumer know we are there to help?" If the agent fails to communicate such a statement within a particular amount of time (e.g., within one minute of a customer stating an issue), then the quality monitoring system 47 may generate a real-time alert to the agent to remind the agent to assume ownership of the problem sometime during the remainder of the interaction in order to avoid getting a low score on this evaluation question.

As such, embodiments of the present invention provide real-time coaching to agents in order to improve their performance by satisfying various quality criteria.

Figure 3:
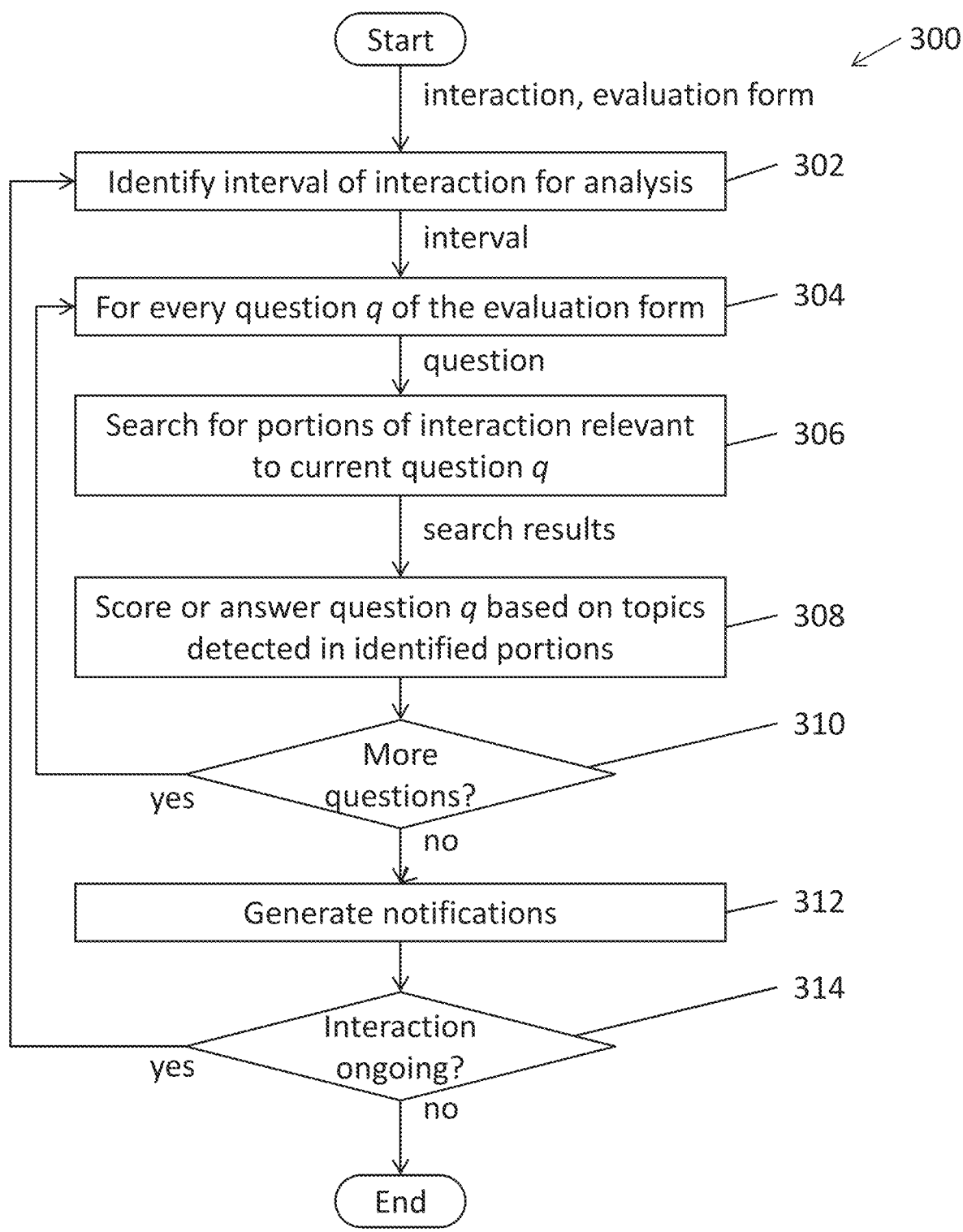
FIG. 3 is a flowchart of a method according to one embodiment of the present invention for automatically generating coaching feedback during an interaction.

FIG. 3 is a flowchart of a method 300 according to one embodiment of the present invention for automatically generating coaching feedback during an interaction.

In operation 302, the quality monitoring system 47 identifies an interval of the interaction for analysis. For example, if this is the first time that the current interaction is being analyzed for performing real-time coaching, then the start of the interval may be the beginning of the interaction and the end of the interval may be the current point in the interaction. If this is not the first analysis for the current interaction, then the start of the interval may be the end point of the previous interval. In other embodiments, the entire length of the interaction from the beginning of the interaction to the current time in the interaction is the interval.

In operation 304, the quality monitoring system 47 selects a next question q of the evaluation form. In operation 306, the quality monitoring system 47 searches for portions of the interaction that are relevant to the current question q to generate search results. As discussed above, these relevant portions in the search results may be portions of the interaction that contain topics that correspond to one or more of the answers to the question q. In some circumstances, none of the portions of the interaction will be relevant to the current question, in which case the search results include no matching portions.

In operation 308, the quality monitoring system 47 scores or answers a question based on the search results for the topics the identified portions of the interaction. For example, a question relating to "agent politeness" may be answered with a higher score based on the frequency with which the agent uses the words "please" and "thank you" during the interaction. As another example, a question relating to "agent profanity" may be answered "yes" if there is even a single instance of the topic "profanity" on the agent side of the interaction. On the other hand, if no profanity was detected, then the "agent profanity" question may be answered "no." If the interaction terminates with the "agent profanity" question unanswered, then the answer may be set to a default answer of "no." The scores and answers determined in operation 308 are stored for later output.

In operation 310, the quality monitoring system 47 determines if there are more questions to attempt to answer. If so, then the process returns to operation 304 to select a next question. If not, then the quality monitoring system 47 generates notifications, if warranted, for any of the scores or answers associated with the questions in accordance with coaching rules associated with the questions. For example, a coaching rule associated with the "agent profanity" question may be triggered when the "profanity" topic is detected in the interaction, and the coaching rule may generate a notification to remind the agent to refrain from using profanity. As another example, if the "agent politeness" score was low, then a coaching rule associated with the "agent politeness" question may indicate that the quality monitoring system should generate a coaching tip to suggest that the agent use polite language more frequently. The generated notifications may be displayed on the user device 38.

After generating the notifications in operation 312, the quality monitoring system 47 proceeds to operation 314 to determine if the interaction is still ongoing. If so, then the process returns to operation 302 to identify a next interval for analysis. In some embodiments, a delay (e.g., 1-2 seconds) is included before selecting the next interval. If the interaction is not still on going, then the process ends.

Embodiments of the present invention are also directed to quality monitoring systems in which a manager can define when to take an action on a specific automatic question from the quality monitoring evaluation form. In one such embodiment, a manager may define a "trigger point" that specifies conditions for taking an action on a particular evaluation question from the evaluation form. For instance, a trigger point may be when a specified question receives a very low score or when a specified question is not answered within a time period (e.g., within 90 seconds) of the start of the interaction. The manager may also define what message should be presented to the agent or what other action should be taken in response to reaching the trigger point.

Gamification

Aspects of embodiments of the present invention relate to gamification mechanisms to reward agents in a contact center based on good performance, such as based on the quality metrics from the evaluations of the interactions. In addition, these gamification techniques may notify and penalize agents for misbehavior or poor performance. The behavior or misbehavior can be automatically detected during an interaction through the real-time automatic evaluation, or after an interaction or a set of interactions.

For example, the quality monitoring system 47 may automatically encourage agents to improve themselves when needed, for example in case of low conversion rate the quality monitoring system 47 can send an encouraging message for a successful new sale. As another example, the agent's performance should be transparent to him or her during the interaction, which may be presented using an automatically computed call performance indicator (e.g., an indicator that shifts between green for good performance and red for bad performance in accordance with the current overall result of the automatic evaluation).

Other aspects of the gamification of agent performance metrics include using a points and rewards system. For example, an overall score for an interaction can be translated into points which may be added to the agent's accumulated set of points over a time period (e.g., a shift and/or a month). In another embodiment, only the overall scores of successful interactions are included in the points, where the success may be determined according to sentiment analysis or appearance of certain topic (e.g., successful sales conversion). If the number of points earned by the agent is above a certain threshold, a reward may be given (e.g., a gift card).

According to other aspects of embodiments of the present invention, bonus points can be awarded based on achieving particular goals. For example, an agent having a high daily ratio of successful calls may earn bonus points, and bonus points may be automatically awarded to an agent who is able to solve a problem that has gone unresolved for several interactions.

According to other aspects of embodiments of the present invention, bonus points can be awarded to mark milestones in achieved proficiency level. For example, for each working day we compute the average number of points the agent got for an interaction and a current proficiency score is computed for each agent by summing up the daily average for each day. Various proficiency levels can be defined by putting thresholds on the proficiency scores. As such, each time the agent passes a threshold proficiency score, the agent reaches the next level and may get a "medal." Each level may be marked by a "Badge" or "Rank" e.g., "Junior", "Senior", "Advanced," and "Expert."

According to other aspects of embodiments of the present invention, bonus points can be displayed on a progress bar. The progress bar may be shown in real-time, in other words, showing the current aggregate score of the current interaction divided by the maximum possible score on this interaction. Another progress bar may also show an ongoing score, in other words, the aggregate number of points in the current day divided by a daily point quota. Still another progress bar may relate to a proficiency score, in other words, the agent's current proficiency score divided by the maximal proficiency score among the agents. Still another progress bar may refer to a long term score, such as the current rank divided by the maximal rank of agents (e.g., the agent's performance percentile when compared with other agents).

According to other aspects of embodiments of the present invention, the quality monitoring system 47 provides each agent's personal performance history and progress/trend graph so that each agent can view their performance over a long term (e.g., months or years) in order to provide context for the agent's current achievements, next achievements, scores, feedback, and the like. Other information provided to the agent by the quality monitoring system 47 includes statistics about particular situations and how many other agents resolved various situations correctly. Looking in the dimension of a specific question or a question group, and the quality monitoring system 47 can provide information across agents or interactions regarding average score, average success cases, and the like. In addition, the quality monitoring system can show the current percentile of the agent with regard to a specific situation or question raised in the interaction.

Monitoring Performance Trends Among the Agents

Aspects of embodiments of the present invention relate to automatically monitoring performance trends among the agents and determining the character of various trends, such as whether problems are specific to particular agents, systemic problems in the training of groups of agents, or systemic problems affecting all agents.

A "non-repeating individual agent issue" refers to sub-par performance or underperforming metrics that is confined to a particular agent or a small group of agents and it is a first time (at least in a particular time period) that the particular agent has this issue. These issues may be addressed with a self-coaching session as described in more detail below.

A "repeating individual agent issue" refers to sub-par performance that is confined to a particular agent or a small group of agents and it is not the first time (at least in particular time period) that the particular agent has had this issue. Because this may be a more serious issue, one action may be to generate a side-by-side coaching session with a supervisor or a trainer.

A "non-process group issue" refers to sub-par performance on a specific issue in a group of agents, but not necessarily all agents. This may represent a failure to properly train the group of agents, or may reflect the need for a refresh on a particular issue by a human trainer or instructor.

A "process group issue" refers to sub-par performance by all agents or substantially all agents on a specific issue. The failure of all agents to be able to address the issue may be indicative of problems of agent empowerment (e.g., agents do not have the authority or resources available to address the issue). These problems can be addressed by the managers/analysts who are able to change the processes within the contact center. For instance, allowing a first tier agent issue refunds of up to a certain amount without supervisor approval versus referring the customers to a supervisor for every refund request.

To distinguish between the above four types of issues, the quality monitoring system 47 collects and aggregates scores for every agent on a periodic basis, such as once per day. One example of such scores on N metrics and a Quality Monitoring (QM) evaluation score for M agents is shown below in Table 1:

TABLE 1

| Agent Id | QM Evaluation score | Quality metric 1 | ... | Quality metric N |
|---|---|---|---|---|
| 1 | 7 | 8 | ... | 7 |
| 2 | 3 | 7 | ... | 1 |
| ... | ... | ... | ... | ... |
| M | 9 | 8 | ... | 10 |

In some circumstances, scores can be specified on an even finer granularity, such as the agent's score on every question in the K questions in the QM evaluation form, as shown, for example, in Table 2:

TABLE 2

| Agent Id | QM $Q_1$ Score | QM $Q_2$ Score | ... | QM $Q_K$ Score |
|---|---|---|---|---|
| 1 | | | | |
| 2 | | | | |
| ... | | | | |
| M | | | | |

In some embodiments of the present invention, the questions Q are all the questions of the QM score that are answered automatically by processing the content of the interaction. These questions may include, for example: "Did the agent greet the customer?" "Did the agent use profanity?" and "Did the agent confirm that all the customer's issues were resolved?"

Embodiments of the present invention detect agent or process problems based on these scores, in both the rough granularity of the metrics of Table 1 and the finer granularity of the metrics of Table 2.

Figure 4:
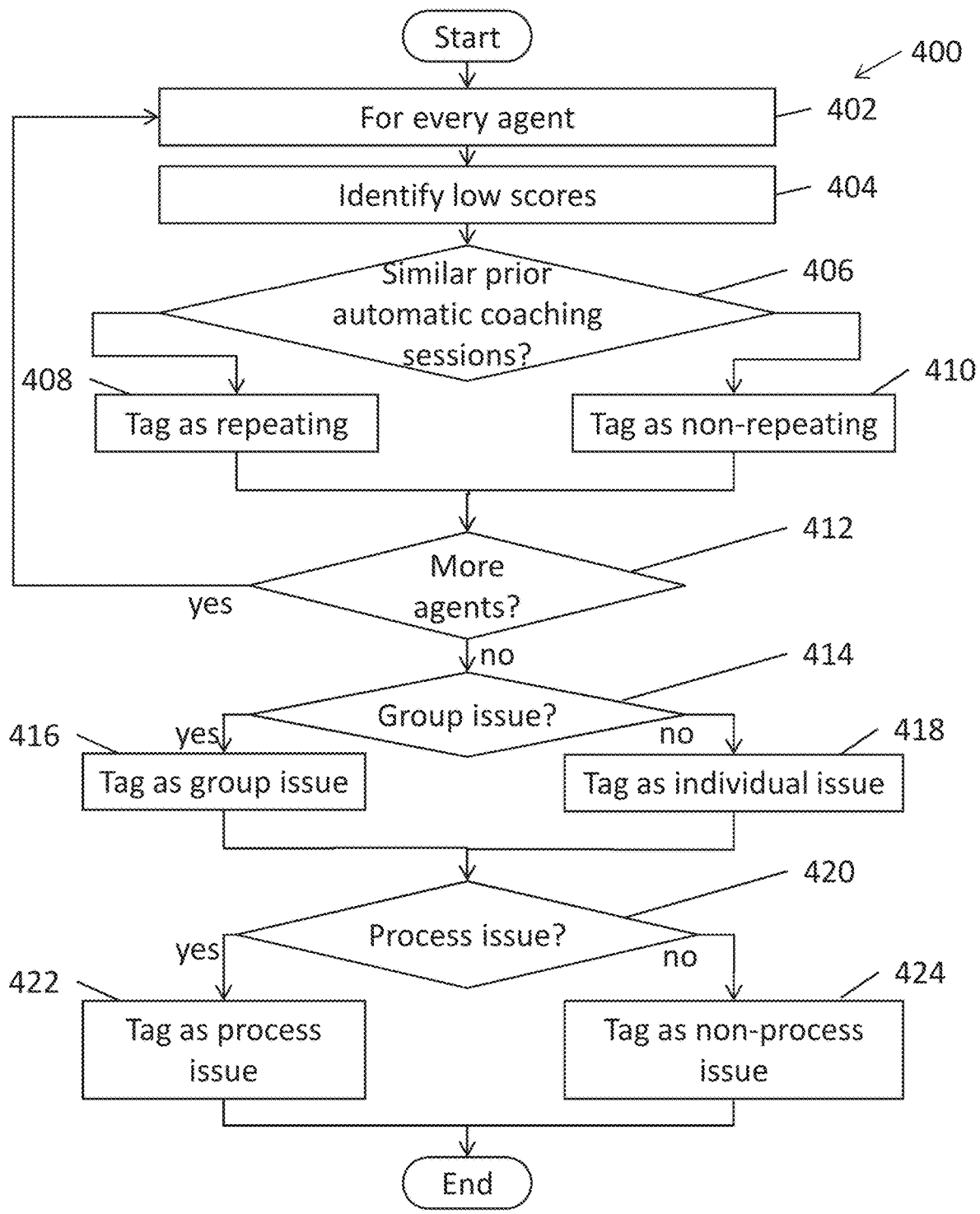
FIG. 4 is a flowchart illustrating a method according to one embodiment of the present invention for determining whether an issue is a non-repeating individual agent issue, a repeating individual agent issue, a non-process systemic issue, or a process systemic issue.

FIG. 4 is a flowchart illustrating a method according to one embodiment of the present invention for determining whether an issue is a non-repeating individual agent issue, a repeating individual agent issue, a non-process systemic issue, or a process systemic issue.

To determine if the problem is an individual agent issue, in operation 402, the quality monitoring system 47 identifies an agent from the set of agents to analyze. In operation 404, the quality monitoring system 47 identifies scores that are low in comparison with other agents or in comparison with previous performance. For example, in some embodiments, "low" can mean lower than a threshold score, e.g., lower than a score of 3 out of a possible 5 points. In some embodiments, "low" may be compared with the score average of other agents, e.g., if for a certain score almost all agents regularly score 5, then an agent that scores 4.5 might need training. In some embodiments, "low" may refer to decreased performance compared to historical performance, such as when a particular agent previously had a consistently high score and more recently has had a lower score because the agent has started to use "shortcuts" to skip parts of the contact center script. If any of these conditions occur, agent coaching will be assigned to this agent, based on the scores that were low.

To determine if the individual agent issue is a repeating or a non-repeating individual agent issue, in operation 406 the quality monitoring system 47 searches a history of automatically generated coaching sessions for this particular agent to determine if this issue has previously occurred (e.g., this agent already had two coaching sessions for profanity in the past 2 months). In this case, in one embodiment, the quality monitoring system 47 tags the issue as repeating in operation 408 and automatically schedules a coaching session with a person (e.g., a manager or a trainer), as described in more detail below. If this incident has not occurred, then it is tagged as non-repeating in operation 410.

In operation 412, the quality monitoring system 47 determines if there are more agents to analyze. If so, then the process returns to operation 402 to select the next agent. If not, then the process continues to operation 414.

To determine if the issue is a group issue, after detecting issues among all of the agents, in operation 414 the quality monitoring system 47 detects whether a group of agents (e.g., multiple agents) has a problem with one or more quality metrics based on their quality monitoring scores. In some embodiments, the group may be identified based on shared characteristics (e.g., membership in the same team). When the quality monitoring system 47 detects that a group of agents has a problem with one or more quality metrics then, in some embodiments, group training is automatically scheduled for all of the affected agents to be trained together.

In some embodiments, in addition to the scores from the quality monitoring evaluation form, the score may also be correlated based on the topics detected by the voice analytics system 45. For example, if a new product was released, and suddenly many people may interact with the contact center to ask about the cost of an upgrade. If this question was unexpected, then the agents may not have received recent training on this issue (e.g., the various upgrade options, the features associated with each option, and the comparative costs of each option). While the quality monitoring evaluation form may lack a specific question related to this issue, many interactions that relate to the upgrade will not end with a positive customer answer to the question "Have I solved all your problems today?" This will result in the agents receiving low scores in these interactions. However, by correlating (or finding the intersection) the question "Problem Solved?" of the quality monitoring evaluation form with all the topics detected by the voice analytics system 45, and in particular, interactions with the topic "upgrade," the quality monitoring system 47 detects low "Problem Solved?" score for this topic across a large number of agents.

To determine if the issue is a non-process group issue or a process group issue, after detecting issues among all of the agents, in operation 420 the quality monitoring system 47 determines what portion of all agents have low scores on a particular quality metric (e.g., on a particular question). When the quality monitoring system 47 determines that substantially all (e.g., more than 80%) of the agents have low scores on a particular question, then this may be an indication that the problem lies in the general agent training program or that the problem lies in the overall systemic processes, such as resources or authority granted to agents to solve problems. For example, problems with systemic processes include situations where when agents are not allowed to offset a fee, offer a replacement, or otherwise take an action that would solve a common problem. This may be contrasted with problems in the training of a specific agent in how to address a problem.

When a process issue is detected, then the issue is tagged as a process issue in operation 422. Several possible actions can take place in response to detecting a process issue: in the short term, until all agents are trained, customers interacting with the contact center about the problematic issues that agents don't know how to handle must be referred to someone else, e.g. a supervisor. In some circumstances, detecting a process issue indicates that the general agent training is to be updated, and all the agents in the contact center must undergo the revised training—or at least the relevant places where their training was flawed. In other circumstances, management may change the processes by giving the agent power to resolve issues (e.g., by offsetting charges). In some embodiments, the quality monitoring system 47 identifies specific examples of several agents behaving incorrectly in order to be used as examples in the generic agent coaching. In still other circumstances, the process error may relate to a problem in the way the automatic quality evaluation is being performed, such as the failure to detect particular topics that do indicate satisfaction of the question of the evaluation form that is incorrectly being judged with failing scores.

On the other hand, when the issue is a non-process issue, then in operation 424 the issue is tagged accordingly and, as discussed above, the problem may be resolved by scheduling group training for the agents affected by the issue.

Automatically Generating Customized Training for Agents

Aspects of embodiments of the present invention relate to automatically generating customized training to the agent based on the evaluations. As discussed above with respect to FIG. 4, in when the quality monitoring system 47 detects low scores for particular questions among individual agents or groups of agents, the quality monitoring system 47 may automatically schedule training sessions for the agents. Because the quality monitoring system 47 can automatically evaluate every interaction in the contact center in real-time, customized training can be provided to agents shortly or immediately after problems occur, thereby tightening the feedback loop and improving the management of agent performance.

These customized training sessions can be automatically generated to address the particular areas that need improvement (e.g., areas in which the agent is underperforming) and can be customized using examples from interactions that the agent was involved in. These results can be triggered in any desired interval of time and without a human intervention. For example, the training session can be initiated immediately after an interaction ends, or in real-time during the call, as described above with respect to FIG. 3, based on the quality metrics needing additional training during the interaction. As another example, the training session can be customized based on a set of interactions handled by the same agent, in which case it may contain aggregate results. In other embodiments, the coaching sessions can be scheduled based on a refresh interval that is determined based on past performance.

Self-Coaching Sessions Generation

In one aspect of embodiments of the present invention, the quality monitoring system 47 automatically generates customized coaching sessions that are tailored to the individual agent or groups of agent who will be receiving the coaching based on the particular problems associated with that group (e.g., particular quality metrics that the individual or group). The coaching session can also be customized by including "positive examples" of the desired behavior and "negative examples" of the undesired behavior, where the examples may be taken directly from the interactions of the individual agent or from interactions of the group of agents.

For example, in one embodiment of the present invention, the quality monitoring system 47 receives one or more evaluations of interactions involving the agents, where the evaluations are computed based on an evaluation form. The evaluations are generated by evaluating the interaction against each of the evaluation questions of the evaluation form, as described above, in order to compute as set of answers and/or scores for each question, where the answer or score to each question corresponds to a quality metric. By aggregating the answers and scores across all of the evaluations, aggregated quality metrics can be computed for each agent (e.g., the agent's computed "politeness" score or "issue resolution" score). Each of these scores can then be compared to a threshold value to determine whether the agent's performance on the quality metric is satisfactory, or if the agent's performance is sub-par. In other words, one or more underperforming quality metrics can be determined from comparisons of the agents' aggregated quality metrics against the thresholds. A customized coaching session can then be generated for the agent by identifying coaching session "reasons" based on which quality metrics are underperforming, where each coaching session reason may be associated with a training module (e.g., descriptions and examples of good and bad performance on each quality metric).

Figure 5:
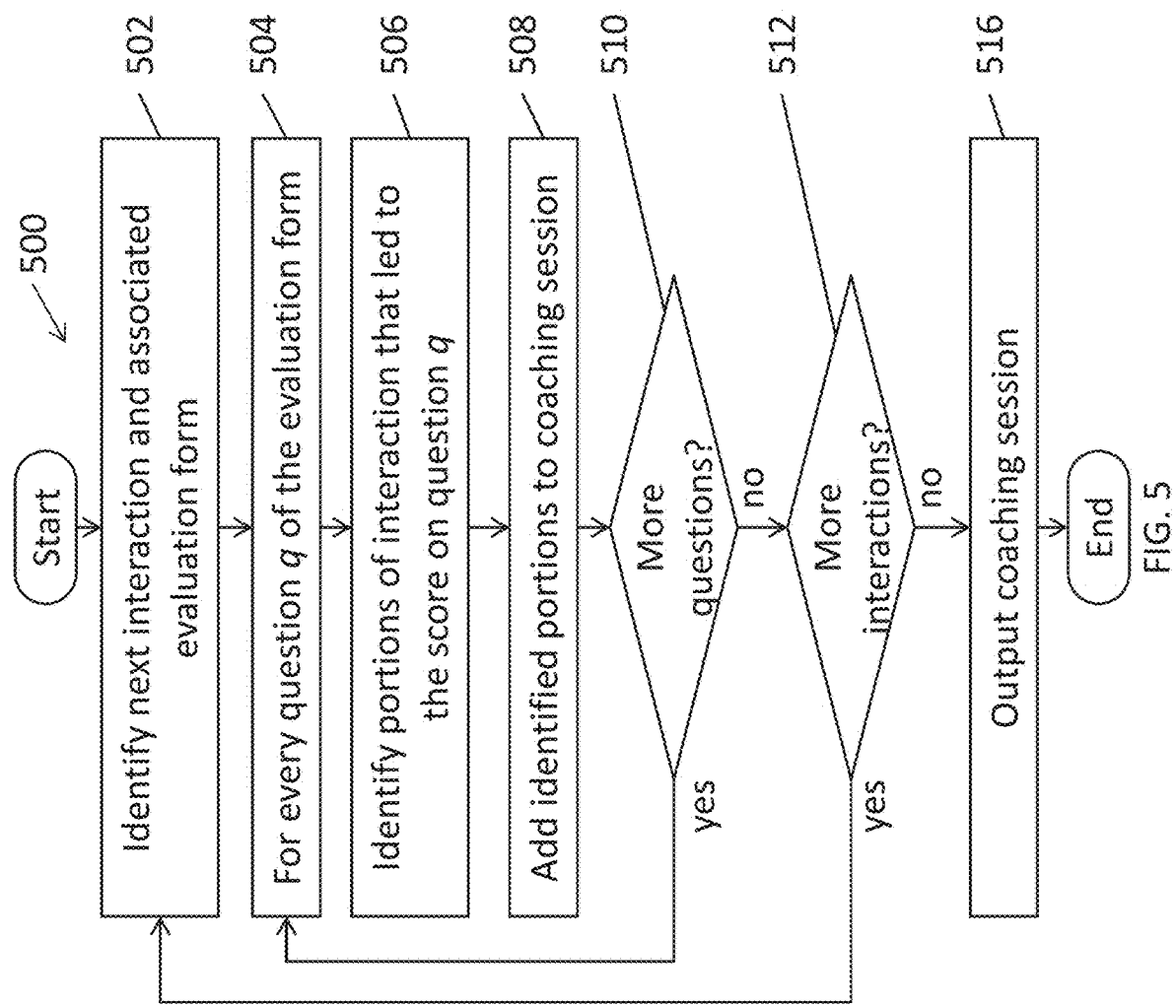
FIG. 5 is a flowchart illustrating a method for generating a customized training session according to one embodiment of the present invention.

FIG. 5 is a flowchart illustrating a method 500 for generating a customized coaching session according to one embodiment of the present invention. In operation 502, the quality monitoring system 47 identifies a next interaction to be considered when generating the customized coaching session (where there may only be a single interaction), and in operation 504, identifies a next question from the quality monitoring evaluation form. In operation 506, the quality monitoring system 47 identifies a portion of the interaction that led to the determination of the score (e.g., the stored portions of the interactions evidencing the score) for question q. For example, for a quality monitoring question relating to "agent politeness," portions of an interaction that contain the topic "profanity" may lead the quality monitoring system 47 to assign a low score to the interaction, whereas portions of an interaction that contain the topic "polite" (e.g., the phrases "please" and "thank you") may lead the quality monitoring system 47 to assign a higher score to the "agent politeness" question.

In operation 508 the quality monitoring system 47 includes the identified examples (e.g., the positive and negative examples) in the customized coaching session. In operation 510, the quality monitoring system 47 determines if there are more questions to consider. If so, then the process returns to operation 504 to select the next question. If not, then the process continues to operation 512, where the quality monitoring system determines if there are more interactions to consider for generating the customized training session. If so, then the process returns to operation 502 to identify the next interaction. If not, then the generated coaching session is output in operation 516.

In some embodiments, the customized coaching session includes both positive and negative examples so the agent can compare the examples, learn the difference, and improve performance. In some circumstances, the quality monitoring system 47 may fail to identify positive examples from the agent's own interactions, and therefore the quality monitoring system 47 may retrieve examples from interactions that involved other agents. In some embodiments these examples involving other agents may be selected from interactions involving similar call reasons or topics (e.g., "upgrade request" or "angry customer"). In some circumstances, the coaching session is limited to topics and questions on which the agent received a low score, such as a score below the 30$^{th}$ percentile among all agents or a score below a particular threshold value, which may be set by a manager.

An example customized coaching session may include the following:
Your score in the Quality Monitoring question
<Did the agent make sure that all the customer's questions were answered?>
Is lower than
<the average of other agents>
For example, here are several calls on which you did not score well in this question
<call 1>
<call 2>
<call 3>
Here are several examples where agents acted correctly in the same situation
<good example 1>
<good example 2>
<good example 3>

In some embodiments of the present invention, the customized coaching session is presented to the agent (e.g., via the agent device 38). After viewing the coaching session, in some embodiments, the agent may provide a confirmation that they understood the examples and how to avoid low scores in the future. In some embodiments, the agent may also provide feedback that the automated quality monitoring system is incorrect in the assessment and that the agent would like coaching by a human supervisor. When the agent is correct that the system was incorrect in its assessment, a human manager may also modify the automatic quality monitoring system 47 to correct the manner in which it evaluates the interactions.

Knowledge Refresh

Some aspects of embodiments of the present invention are directed to automatically scheduling trainings for individual agents or groups of agents based on historical performance. For example, these scheduled trainings are not prompted or triggered by any particular incident or event (e.g., a low score in a particular quality metric), but instead may be trigged based on predicting when an agent may benefit from proactive knowledge refresh training before those skills are lost and before performance begins to appreciably decline.

Figure 6:
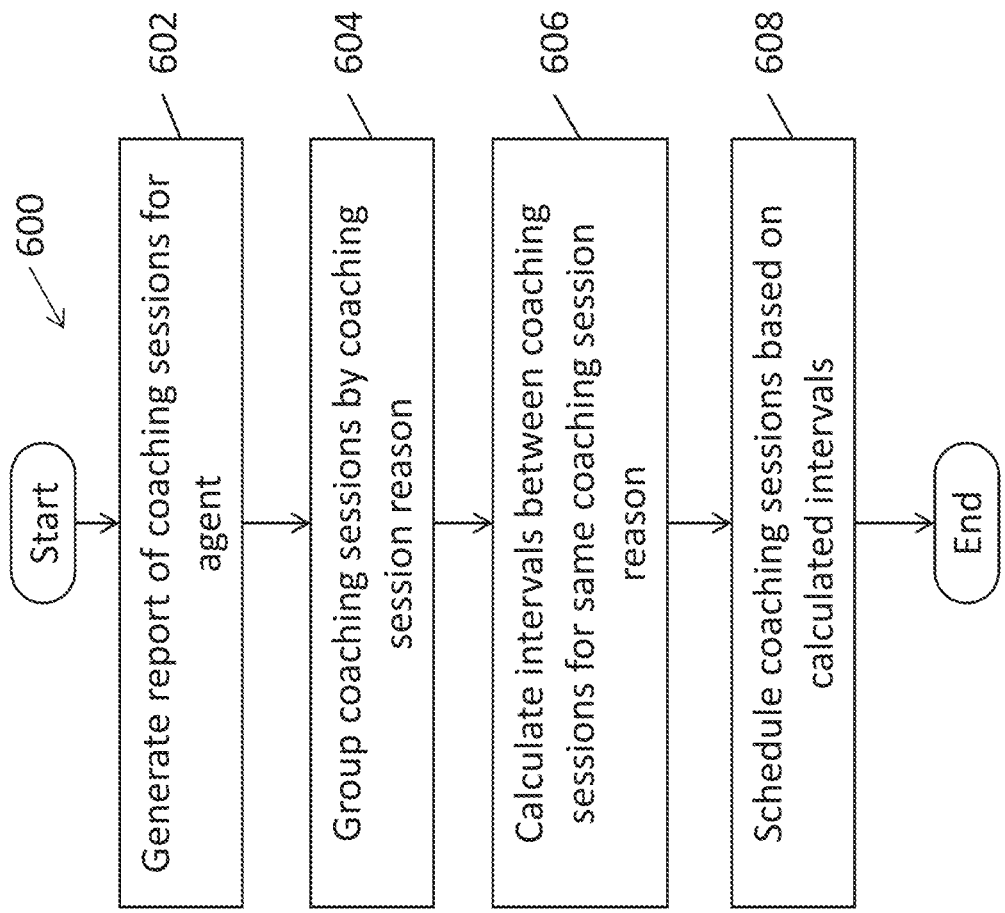
FIG. 6 is a flowchart illustrating a method for calculating a knowledge refresh interval according to one embodiment of the present invention.

As such, in some embodiments of the present invention, the quality monitoring system 47 automatically predicts when a particular agent may need to refresh their knowledge regarding subject matter relevant to the contact center. FIG. 6 is a flowchart illustrating a method 600 for calculating a knowledge refresh interval according to one embodiment of the present invention.

In one embodiment, the quality monitoring system 47 generates a report or list of coaching sessions that were previously automatically generated for a particular agent, a timestamp corresponding to the date on which the coaching session was generated, and the reason or reasons for triggering the coaching session. One example of such a report is shown below in Table 3:

TABLE 3

| Agent Id | Date | Coaching session reason |
|---|---|---|
| 345 | May 30, 2016 | Profanity |
| 345 | Jul. 10, 2016 | Profanity |
| 345 | Aug. 17, 2016 | Profanity |

In operation 604, the quality monitoring system 47 groups the coaching sessions by reason. If a coaching session had multiple reasons, then it may be split into multiple rows, one row for each reason, such that the coaching session appears in each group corresponding to one of its coaching session reasons.

The quality monitoring system 47 can use the report, grouped by coaching session reason, for the agent to predict, automatically, the next time that the agent will require additional coaching for a given reason based on the time intervals between previous training sessions for that coaching session reason. In the above Table 3, the same agent underwent three coaching sessions for "profanity" on May 30, 2016, Jul. 10, 2016, and Aug. 17, 2016. These coaching sessions were triggered by the agent's use of profanity during an interaction with a customer, and the coaching sessions are approximately 40 days apart from each other. This suggests that the agent has a repeating pattern of using profanity and that the agent relapses into using profanity approximately 40 days after a coaching session that reminds the agent to avoid using profanity.

Based on this prediction of a 40 day lifetime of training to avoid the use of profanity, in operation 608, the quality monitoring system 47 may automatically schedule coaching sessions to refresh the agent's knowledge based on the predicted intervals (e.g., slightly less than 40 days after the previous training session). For example, the quality monitoring system may schedule a coaching session on profanity to occur 35 days after the most recent coaching session on profanity.

Alternatively, the interval between knowledge refresh coaching sessions can be scheduled by tracking the quality monitoring scores over time (either in general or on a question specific basis). Generally, it is assumed that performance (or quality metric) improves immediately after a coaching session and then declines from that peak until the next training. At some point during the decline, the performance level may cross a threshold performance level to become unacceptable. As such, the training intervals may be defined by the average (or expected) time from the coaching session until the performance crosses below the threshold performance level. Averaging across several "performance drops" from the history.

In other embodiments of the present invention, the quality monitoring system 47 uses the report to estimate intervals for scheduling trainings to refresh agents on general knowledge regarding the contact center. For example, in many agents of a particular contact require profanity training every five weeks, then this training may be made a part of the contact center's general processes.

Automatically Calculating Evaluation Scores for Individual Interactions

Aspects of embodiments of the present invention relate to automatically calculating overall evaluation scores of individual interactions. Generally, an overall evaluation score of an interaction combines the scores from the questions of the evaluation form, where the questions may have different weights when combined to generate the overall score.

As noted above, while the quality monitoring system 47 may be able to answer some questions of the evaluation form accurately and automatically using the topics detected within the interaction being evaluated, the evaluation form may include other questions that cannot be answered by an automatic system (e.g., the automatic system may have a high error rate and therefore may fail to produce answers to these questions with sufficiently high accuracy). Questions that can be answered automatically will be referred to herein as "automatic questions" $Q^A$, whereas questions that cannot be answered automatically are answered manually by a human and therefore will be referred to as "manual questions" $Q^M$.

As a result, when an evaluation form includes manual questions, it can be difficult to calculate the overall evaluation score through an automatic process.

As such, embodiments of the present invention relate to using a trained predictive model to predict an overall evaluation score automatically for each interaction without answers to the manual questions $Q^M$ of the evaluation form. Generally, an input is supplied to the predictive model where the input is a representation of an interaction.

In one embodiment of the present invention, a prediction of the overall evaluation score, which also encapsulates the answers to the "difficult" questions (e.g., the questions that cannot be accurately answered automatically by the quality monitoring system 47) can be computed using machine learning techniques. In these embodiments of the present invention, the quality monitoring system 47 automatically computes answers to the automatic question and supplies the automatically computed answers to a trained prediction model, which, in response, outputs a prediction of the overall evaluation score. The trained prediction model may be, for example, a neural network or a deep neural network.

When applying a supervised machine learning technique to predict an overall evaluation score, interactions that were evaluated by human evaluators and the associated answers to an evaluation form may be used as training data. The associated answers include the answers to the manual questions provided by the human evaluators, along with answers to the automatic questions (which may be provided by the quality monitoring system or by the human evaluators).

The inputs to the prediction model may include the automatically computed scores of the interaction on the automatic questions of the evaluation form. The inputs may also include a representation of the interaction and/or the context of the manual questions, where the context can be deduced from the interaction and deduced from the manual questions in the form and their relation to the interaction.

The prediction model outputs the overall score of the quality monitoring evaluation form. This overall score is a weighted function of the scores on all the questions (both automatic questions and manual questions) of the evaluation form. The output may also be referred to as a "target."

Figure 7:
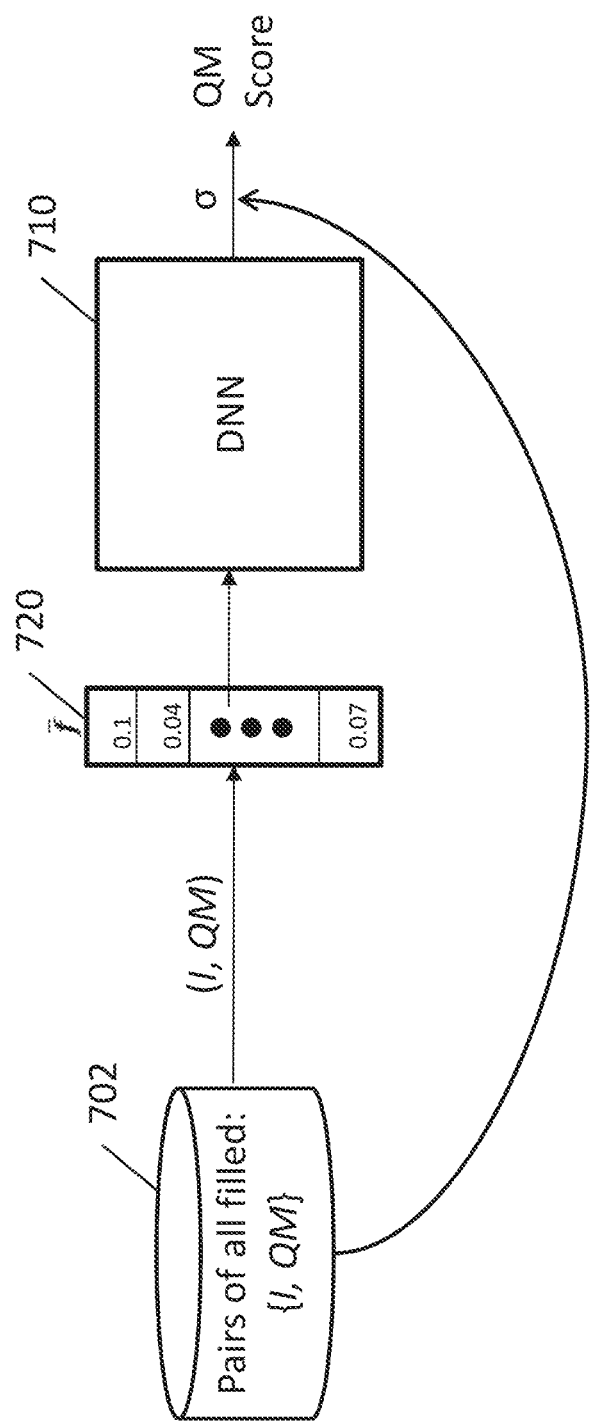
FIG. 7 is a block diagram of a general prediction model according to one embodiment of the present invention.

FIG. 7 is a block diagram illustrating the training of a general prediction model according to one embodiment of the present invention. As shown in FIG. 7, a stored collection 702 of pairs of previous interactions I and their associated evaluations QM (pairs I, QM) is used as training data for training a prediction model 710. During training, each a collection of features is extracted from the interaction I to create an input 720. This input 720 may include, for example, the scores of the interaction I on the automatic questions of a quality monitoring evaluation form. The input 720 is supplied to the predictive model 710, and the desired output (or target) is the overall evaluation score, where the overall evaluation score is extracted from the corresponding evaluation QM associated with the interaction I.

Figure 8:
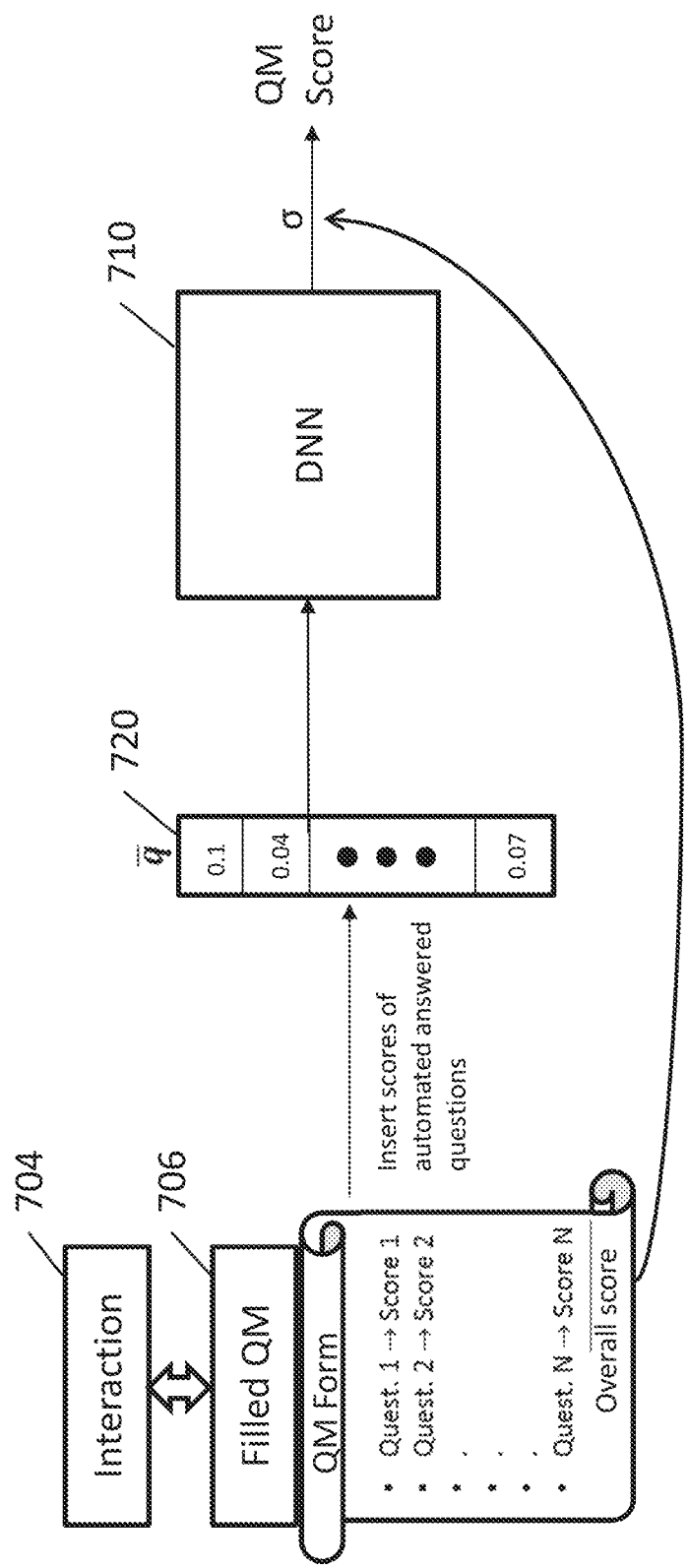
FIG. 8 is a block diagram illustrating the training of a prediction model according to one embodiment of the present invention using answers to the automatic questions.

FIG. 8 is a block diagram illustrating the training of a prediction model according to one embodiment of the present invention using answers to the automatic questions, thereby using only the answers to the automatic questions to predict an the overall evaluation score without the use of answers to the manual questions. As shown in FIG. 7, the training data 702 includes interactions I and their corresponding filled evaluation forms QM.

In one embodiment, the answers to the automatic questions are represented as a collection (e.g., a vector or a feature vector) q of scores (e.g., $\bar{q}=[0.03, 0.05, 0.4, \ldots, 0.2]$). The target output σ (in this case, the overall evaluation score) is influenced by both the automatic and manual questions. FIG. 8 shows one sample interaction 704 and its corresponding filled evaluation form QM 706 from the training data being used to train the prediction model 710.

Using the automatic questions paired with the associated target output $\{(\bar{q}, \sigma)\}$ extracted from the historical data, the quality monitoring system 47 trains a predictive model that estimates the overall score σ from the input answers to the automatic questions $\bar{q}$. For example, the predictive model may be a deep neural network (DNN) that can be trained on the training using backpropagation. In another embodiment, the predictive model is a linear regression model, where the training process computes weights for each of the scores on the automatic questions $\bar{q}$.

Once the prediction model 710 has been trained, such as through linear regression or applying backpropagation to train a neural network or a deep neural network, the prediction model 710 can be applied to predict an overall evaluation score σ. Note that, when performing predictions, the external inputs are the interaction to be evaluated, an empty evaluation form (e.g., an evaluation form that has no answers), and the trained prediction model 710.

Using the automatic evaluation process described above, the automatic questions $Q^A$ of the evaluation form 706 can be filled in, but the manual questions $Q^M$ of the form will remain unanswered. As such, the computed input to the prediction model will include the answers to the automatic questions $Q^A$.

The performance of the trained prediction model can be tested using a test set of data from the historical interactions.

In some circumstances, a contact center may use more than one type of quality monitoring evaluation form. For example, one quality monitoring evaluation form may relate to sales capabilities, while another quality monitoring form may relate to agent professionalism. However, there may be some interrelation between the answers in one form and the overall score for another form.

Figure 9A:
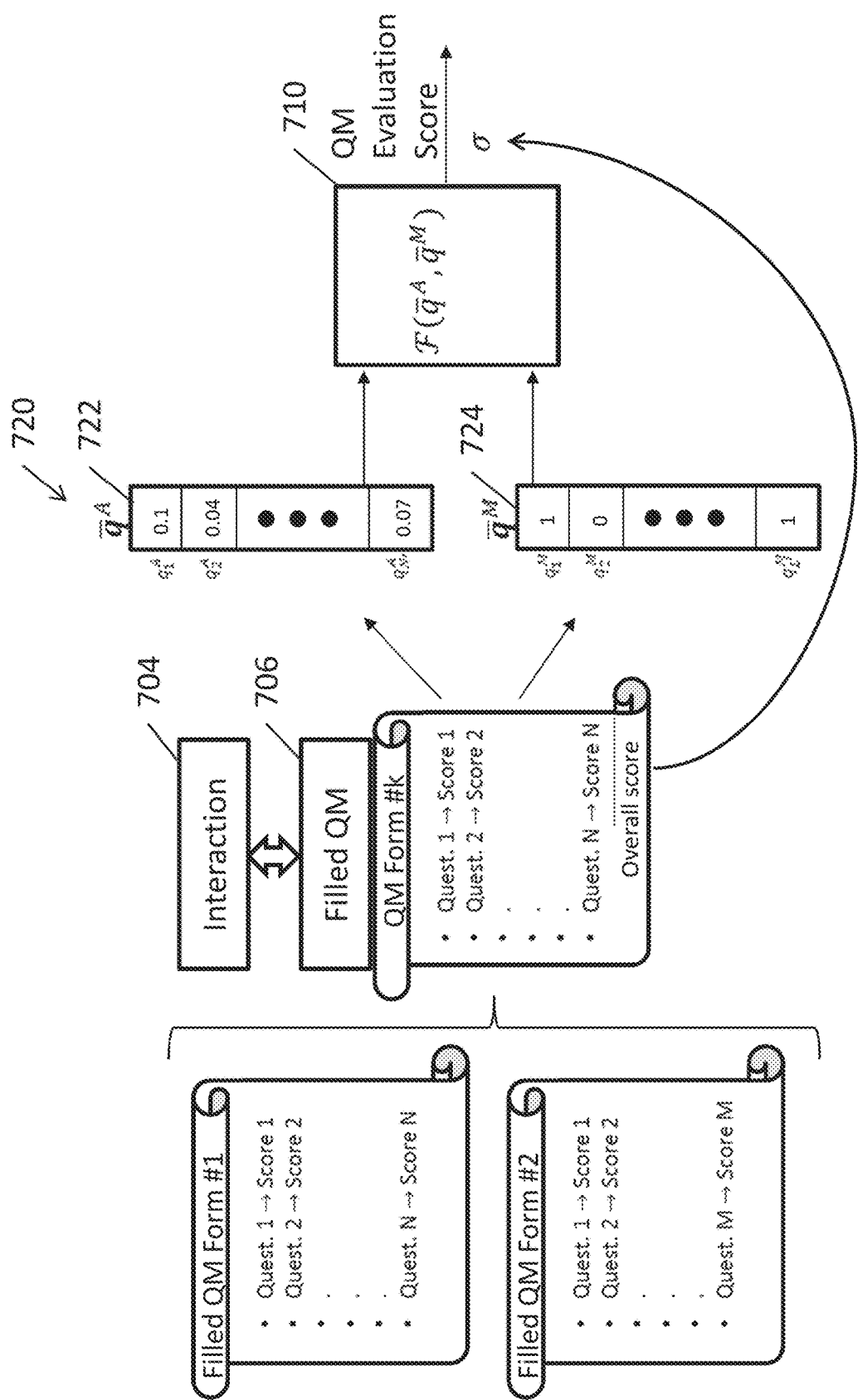
FIG. 9A is a block diagram illustrating the training of a prediction model according to one embodiment of the present invention using answers to the automatic questions of multiple different forms.

FIG. 9A is a block diagram illustrating the training of a prediction model according to one embodiment of the present invention using answers to the automatic questions of multiple different forms, thereby using the answers to the automatic questions of multiple forms to predict an overall evaluation score without the use of answers to the manual questions.

In this embodiment, the training data includes multiple sets of pairs of interactions and completed evaluations QM scores. FIG. 9A illustrates two completed evaluation forms $QM_1$ and $QM_2$, each of which has scores for each of the questions on the forms. These two different completed evaluation forms correspond to two different sets of pairs of interactions and completed forms: $\{(I, QM_1)\}$ and $\{(I, QM_2)\}$. Applying the above technique, two different prediction models may be generated using the two data sets. However, there may be some overlap between the questions in the different forms (e.g., questions that appear on multiple forms). As such, it may be possible, instead, to produce a single predictive model that can predict both $QM_1$ and $QM_2$ for an interaction. In that case, a predictive model can be trained to make a prediction of an overall QM score while taking into account the latent influence of the manual questions that exist in the form on the overall score.

Figure 9B:
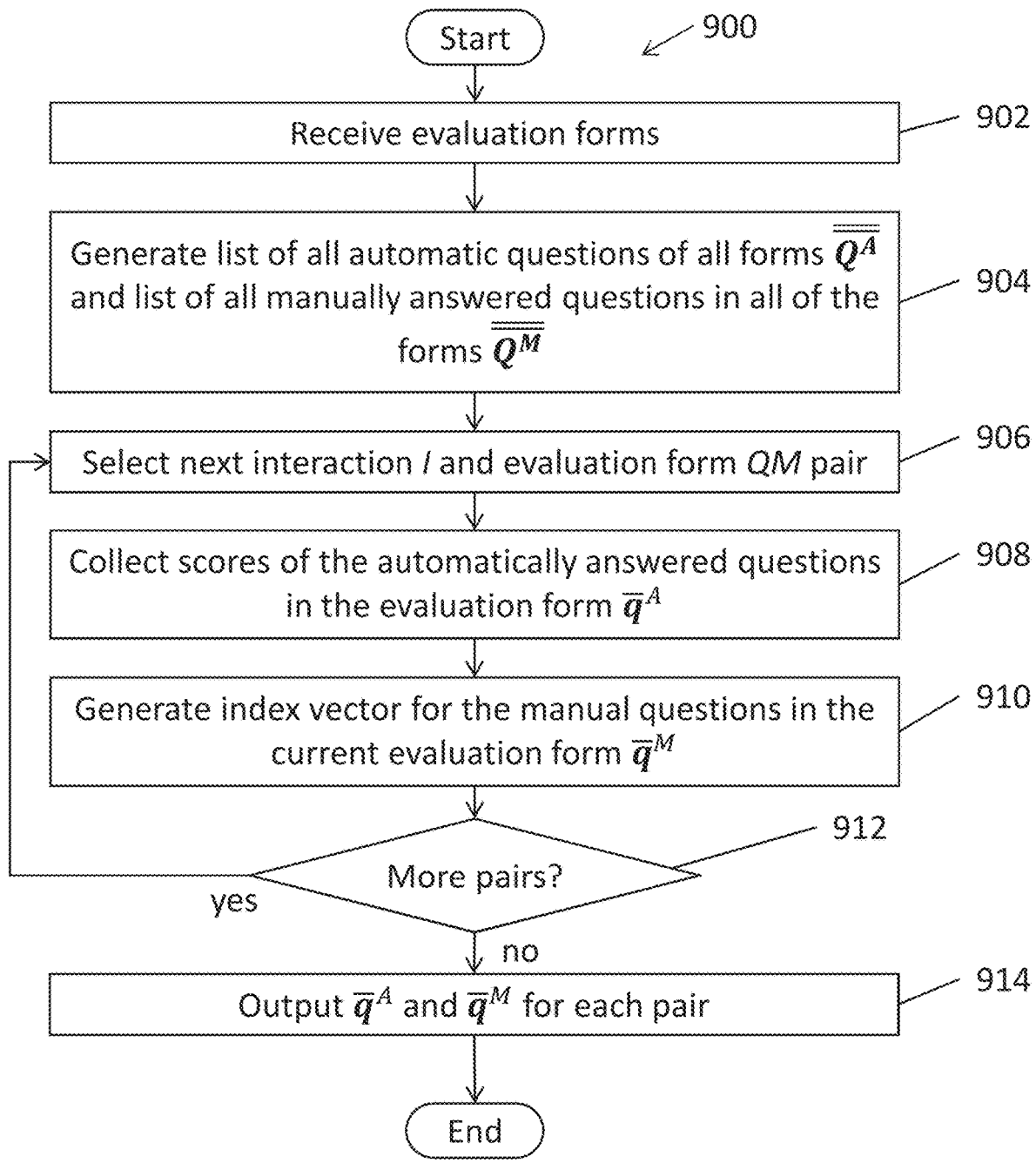
FIG. 9B is a flowchart illustrating a method for generating a predictive model for multiple quality monitoring evaluation forms according to one embodiment of the present invention.

FIG. 9B is a flowchart illustrating a method for generating a predictive model for multiple quality monitoring evaluation forms according to one embodiment of the present invention. Referring to FIG. 9B, in operation 902, the quality monitoring system 47 receives all of the evaluation forms to be used in the predictive model. In operation 904, the quality monitoring system 47 creates a list of all automatically answered questions in all of the evaluation forms $\overline{Q^A}$ (where $\overline{Q^A}$ is defined as a super set of all the automatic questions from all the QM forms in the site), and creates a list of all manually answered questions in all of the forms $\overline{Q^M}$ (where $\overline{Q^M}$ is defined as a super set of all the manual questions from all the QM forms in the site).

Given a quality monitoring evaluation form of a certain type: $\overline{q}^M$ is defined herein to be the vector that indicates which manual questions from $\overline{Q^M}$ appear in the form ("1-of-N" encoding) and $\overline{q}^A$ is defined to be the vector of scores of automatic questions from $\overline{Q^A}$ with zeros for questions that do not appear in the form. In addition, N' may be defined as the number of elements in the set of automatic questions $\overline{Q^A}$, and L' may be defined as the number of questions in the set of manual questions $\overline{Q^M}$.

When processing the training data, in operation 906, the quality monitoring system 47 selects a next interaction I and evaluation form QM pair. In operation 908, the quality monitoring system 47 creates a vector $\overline{q}^A$ with scores of the automatically answered questions in the current evaluation form, where questions without answers (e.g., questions that do not appear in the current evaluation form QM) receive a default value (e.g., zero). In addition, the quality monitoring system 47 generates an index vector $\overline{q}^M$ for the manual questions in the current evaluation form QM in operation 910, where the value of is "one" where the manual question exists in the current evaluation form QM and is "zero" if the question does not exist in the current form QM.

In operation 912, the quality monitoring system determines if there are more interaction/evaluation form pairs. If so, then the process returns to operation 906 to select the next pair. If not, then the generated training inputs $\overline{q}^A$ and $\overline{q}^M$ are output in operation 914 so that they can be supplied to the predictive model 710 for training the predictive model (e.g., using linear regression or backpropagation).

As such, the training module can be trained based on both the automatic scores of the evaluated interactions and the context of the evaluation (e.g., the presence of particular manual questions in the form).

Figure 10A:
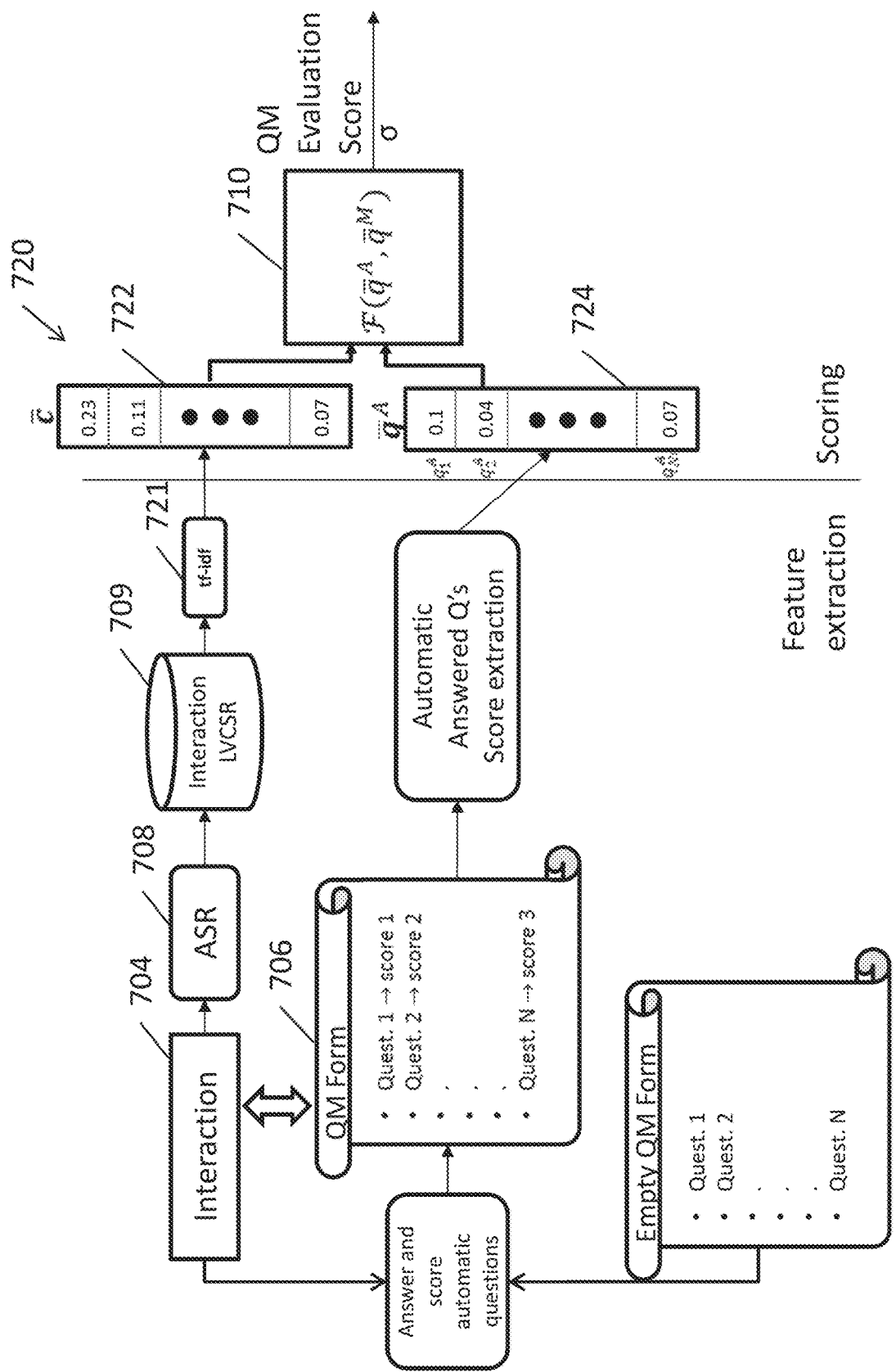
FIG. 10A is a block diagram illustrating the training of a prediction model according to one embodiment of the present invention in which interaction context is also used to predict the overall evaluation score.

FIG. 10A is a block diagram illustrating the training of a prediction model according to one embodiment of the present invention in which interaction context is also used to predict the overall evaluation score. One way to add this interaction context is to include context features $\overline{c}$ that represent the interaction itself to the input to the prediction model.

In one embodiment, the presence of particular words, phrases, and/or topics in the interaction can supplied as the context features $\overline{c}$ that are supplied as additional input to the prediction model. In embodiments where the interaction is a voice interaction, an automatic speech recognition (ASR) engine 708 may be used to convert the voice data into text data or "Interaction LVCSR" data 709. In some embodiments, the presence of particular words and phrases is represented as a term frequency-inverse document frequency (tf-idf) vector 721.

As such, when preparing the training data from the collection of historical interactions, in one embodiment, the quality monitoring system 47 generates the set of context features $\overline{c}$ for each interaction by calculating the tf-idf of each word and phrase in a defined set of words and phrases. This set of context features $\overline{c}$ (or context vector) is supplied along with the answers to the automatic questions $\overline{q}^A$ to train the prediction model 710 to generate the desired target output (e.g., the known overall evaluation score from the evaluation form QM of the interaction I), by applying an appropriate training algorithm such as linear regression or, in the case of a neural network or deep neural network, backpropagation.

Figure 10B:
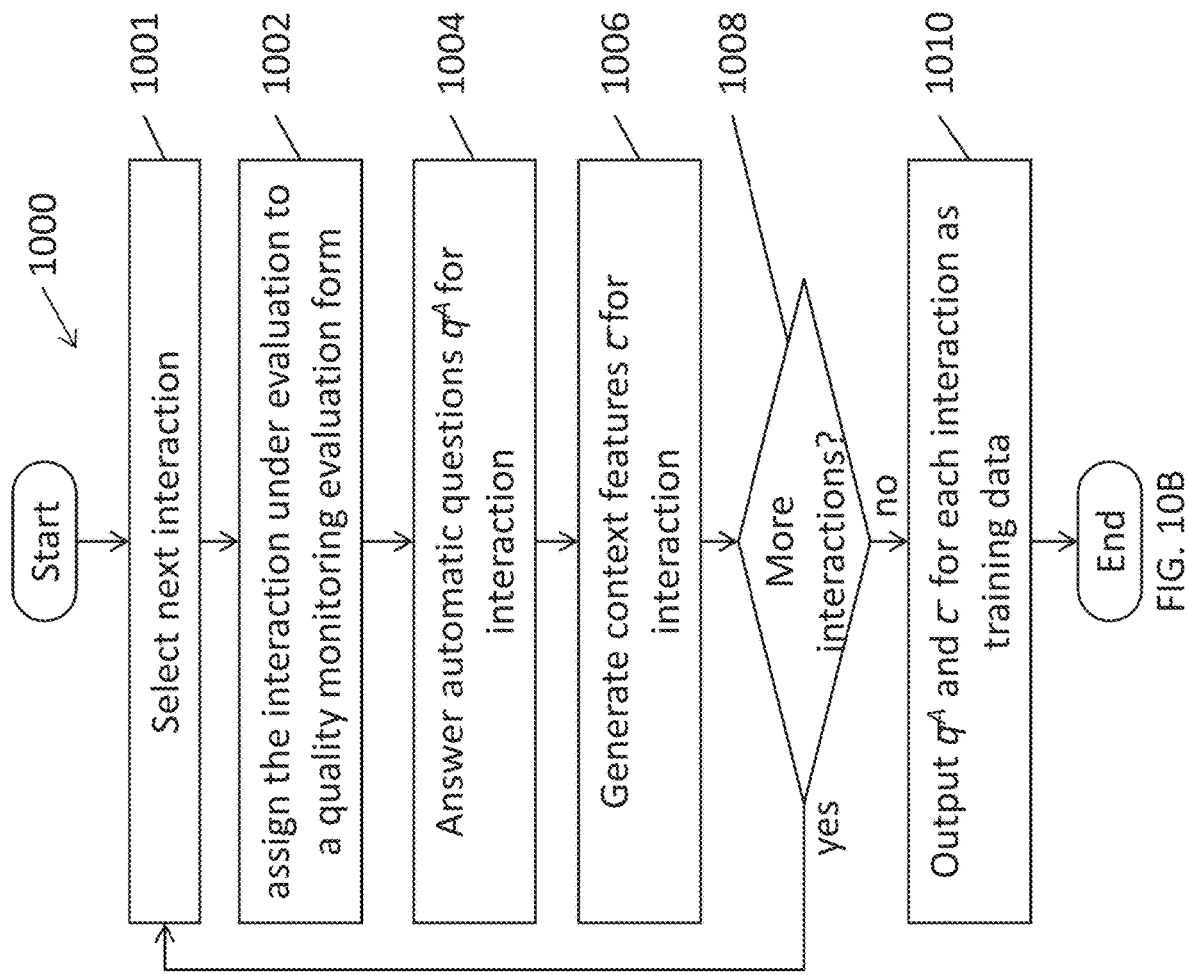
FIG. 10B is a flowchart illustrating a method for applying a prediction model to an interaction using interaction context according to one embodiment of the present invention.

After training the prediction model, the quality monitoring system 47 can apply the prediction model to evaluate, automatically, new interactions. FIG. 10B is a flowchart illustrating a method 1000 for applying a prediction model to an interaction using interaction context according to one embodiment of the present invention. In operation 1001, the quality monitoring system 47 selects a next interaction from the training data for processing. In operation 1002, the quality monitoring system 47 assigns the interaction under evaluation to a quality monitoring evaluation form (e.g., based on a manager selection, such as a sales evaluation form for a sales interaction). In operation 1004, the automatic questions of the evaluation form are answered (e.g., using the method described above with respect to FIG. 2) to generate a set of automatic answers $\overline{q}^A$. In operation 1006, a set of context features $\overline{c}$ is generated (e.g., by calculating tf-idf for words and phrases in the interaction). In operation 1008, the quality monitoring system 47 determines if there are more interactions in the training data to prepare. If so, then the process returns to operation 1001. If not, then, in operation 1010, the quality monitoring system 47 supplies the resulting automatic answers $\overline{q}^A$ and context features $\overline{c}$ as inputs to the prediction model 710, which may be trained using, for example, linear regression or backpropagation, in the case of a neural network.

In some embodiments, other context features may be used instead of, or alongside the tf-idf of the words or phrases. These may include semantic features such as "word2vec" embedding of words from the interaction and sentiment analysis features (e.g., detected topics within the interaction).

As such, in some embodiments of the present invention, the overall quality monitoring score can be predicted using contextual data found in the interaction along with scores of the automatic questions.

Figure 11:
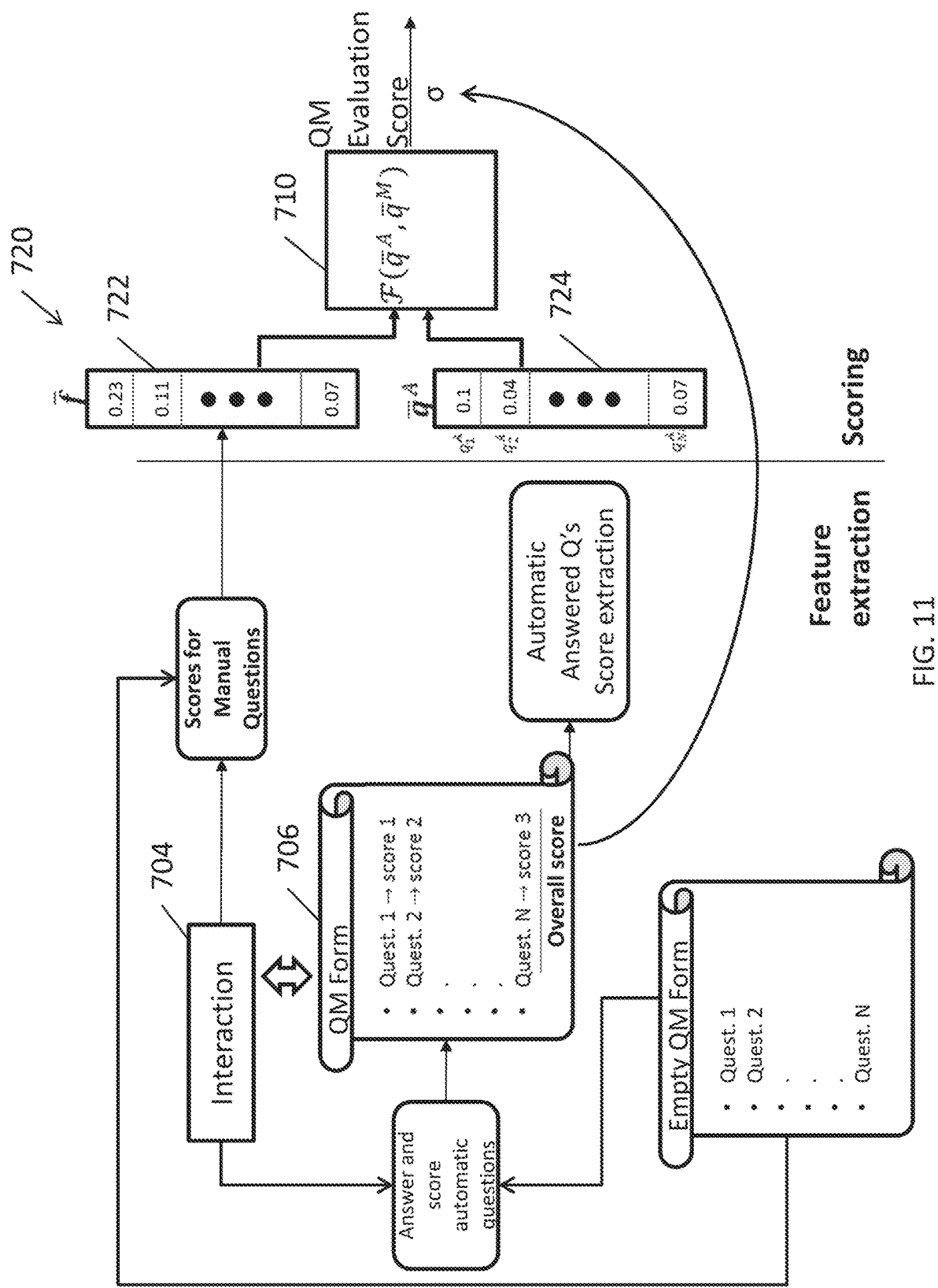
FIG. 11 is a block diagram illustrating the training of a prediction model using semantic relevance analysis according to one embodiment of the present invention.

In still other embodiments of the present invention, the inputs to the prediction model 710 include scores for the manual questions that are automatically generated using semantic relevance analysis, in addition to the automatic answered questions. FIG. 11A is a block diagram illustrating the training of a prediction model using semantic relevance analysis according to one embodiment of the present invention. The input to the prediction model 710 includes $\bar{q}^A$, which are the scores of the automated answered questions along with $\bar{t}$, which are values assigned to the manual questions.

In one embodiment, the $\bar{t}$ values are computed using a scoring method similar to that described in in U.S. patent application Ser. No. 15/133,188 "Quality Monitoring Automation in Contact Centers."

In some embodiments, manual question of the evaluation form is scored in accordance with its similarity to topics found in the current interaction being evaluated. For example, word2vec may be used to compute a similarity between the manual questions and the topics found in the interaction.

In some embodiments, information retrieval based techniques can be applied to score the manual questions. In particular, the manual questions of the evaluation forms of the training data can be indexed according to sets of question-answer-document triples $\{q, a, i_d\}$, where q is the question, a is the corresponding answer (e.g., a score from a manually completed evaluation form from the training data), and $i_d$ is the interaction document. To automatically score a manual question for which there was no manually generated answer, the quality monitoring system 47 searches the indexed triples to find a best match. In particular, given the current manual question being answered $q_k$ and the current interaction document $i_{dk}$, an indexed triple $\{q, a, i_d\}$ having q and $i_d$ values that are most similar to $q_k$ and $i_{dk}$ is identified, and the score a associated with that identified triple is output as the score for the manual question.

As such, in some embodiments of the present invention, the training of the prediction model is performed using the interactions themselves along with the relations between interactions and the manual questions.

Computing Devices

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Each of the various servers, controllers, switches, gateways, engines, and/or modules (collectively referred to as servers) in the afore-described figures may be a process or thread, running on one or more processors, in one or more computing devices 1500 (e.g., FIG. 12A, FIG. 12B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 12A:
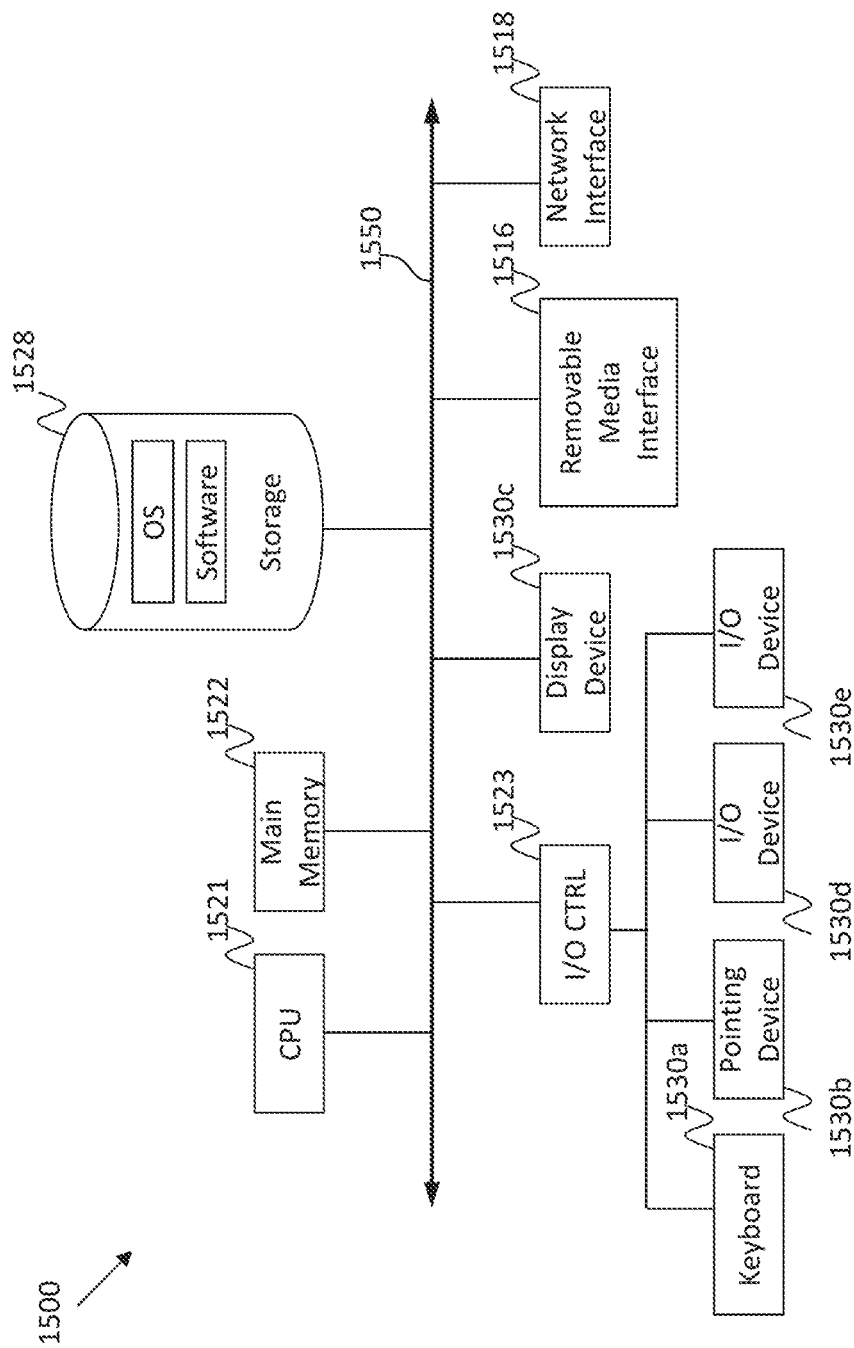
FIG. 12A is a block diagram of a computing device according to an embodiment of the present invention.
Figure 12B:
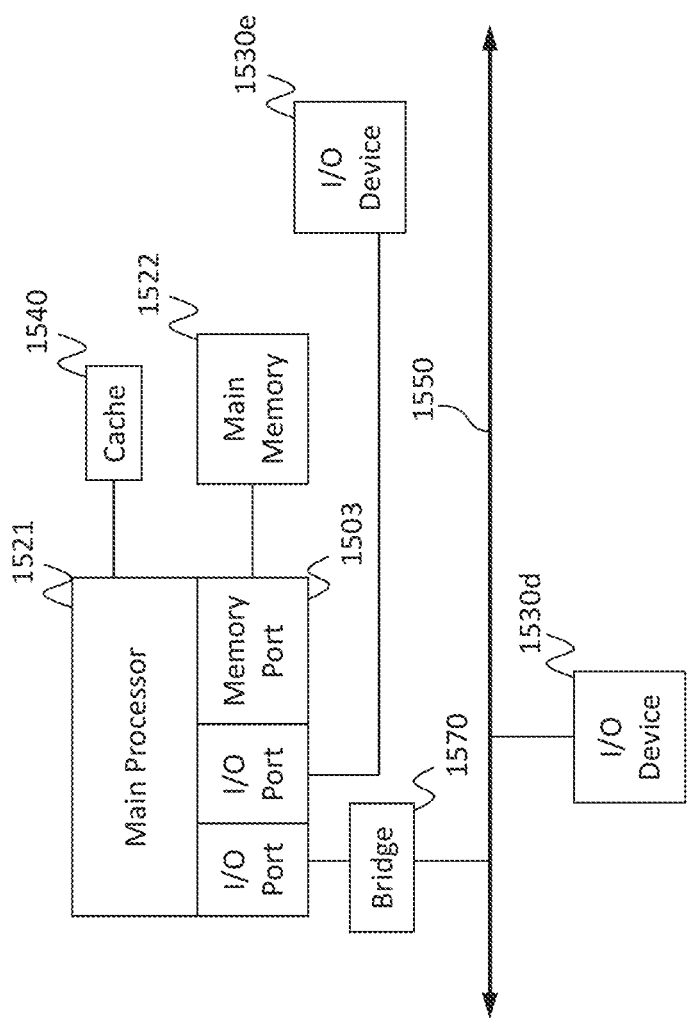
FIG. 12B is a block diagram of a computing device according to an embodiment of the present invention.

FIG. 12A-FIG. 12B depict block diagrams of a computing device 1500 as may be employed in exemplary embodiments of the present invention. Each computing device 1500 includes a central processing unit 1521 and a main memory unit 1522. As shown in FIG. 12A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 12B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 12A, the central processing unit 1521 communicates with the main memory 1522 via a system bus 1550. As shown in FIG. 12B, the central processing unit 1521 may also communicate directly with the main memory 1522 via a memory port 1503.

FIG. 12B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 12A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 12B depicts an embodiment of a computer 1500 in which the central processing unit 1521 communicates directly with I/O device 1530e. FIG. 12B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 12A, may control the I/O devices. The I/O controller may control one or more I/O devices such as a keyboard 1530a and a pointing device 1530b, e.g., a mouse or optical pen.

Referring again to FIG. 12A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530c, which each may be of the same or different type and/or form.

As such, any of the I/O devices 1530 and/or the I/O controller 1523 may include any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect, or otherwise use the display devices 1530c. In one embodiment, a video adapter may include multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 12A-FIG. 12B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

As shown in FIG. 12C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 12D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 12E:
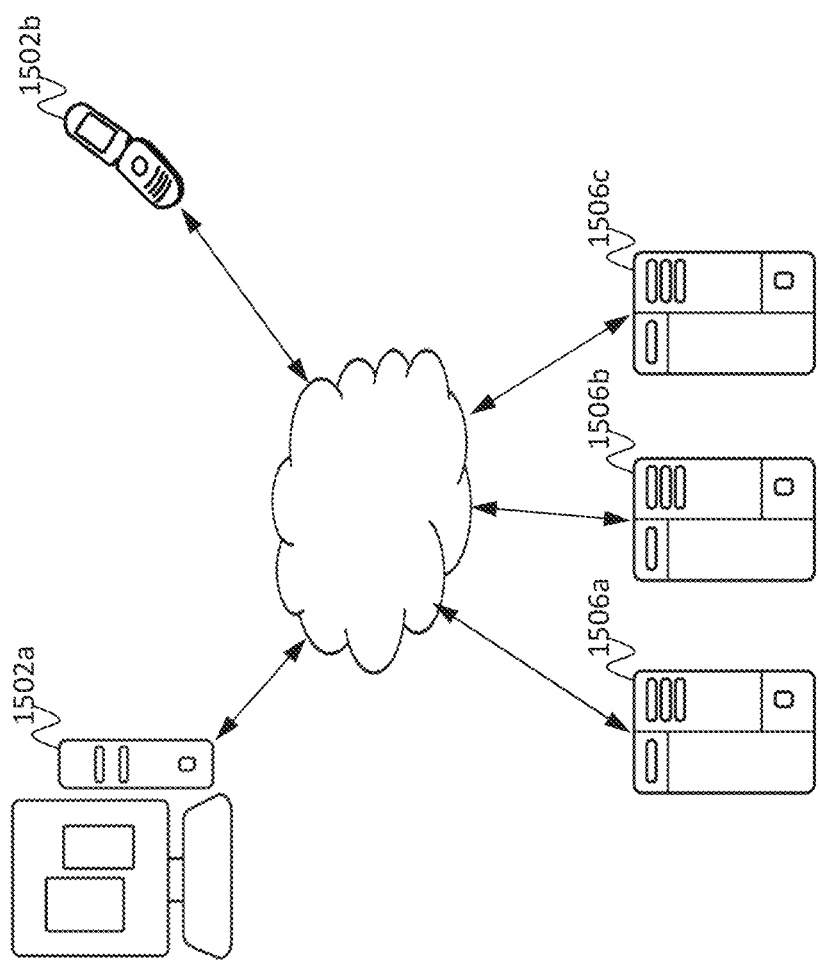
FIG. 12E is a block diagram of a network environment including several computing devices according to an embodiment of the present invention.

A computing device may be one of a plurality of machines connected by a network, or it may include a plurality of machines so connected. FIG. 12E shows an exemplary network environment. The network environment includes one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 12E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 12E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method comprising:
   receiving, by a processor, an evaluation form comprising a plurality of evaluation questions;
   receiving, by the processor, an interaction to be evaluated by the evaluation form;
   selecting, by the processor, an evaluation question of the evaluation form, the evaluation question comprising a rule associated with one or more topics, each of the topics comprising one or more words or phrases;
   searching, by the processor, the interaction to detect the one or more topics of the rule by identifying the presence of one or more words or phrases in the interaction that are among the one or more words or phrases of each of the one or more topics of the rule and generating a search result comprising the one or more detected topics of the interaction;
   calculating, by the processor, an answer to the evaluation question in accordance with the rule and the search result comprising the one or more detected topics of the interaction; and
   outputting, by the processor, the calculated answer to the evaluation question of the evaluation form.

2. The method of claim 1, further comprising:
   determining whether the calculated answer triggers a coaching rule of a plurality of coaching rules, the coaching rule corresponding to the evaluation question; and
   generating a notification in accordance with the answer to the evaluation question.

3. The method of claim 2, wherein the generating the notification comprises identifying, based on the calculated answer, a coaching tip from a plurality of coaching tips associated with the coaching rule, and
   wherein the notification comprising the coaching tip.

4. The method of claim 2, wherein the generating the notification occurs in real-time during the interaction.

5. The method of claim 1, wherein the interaction is a voice interaction,
   wherein the method further comprises supplying the voice interaction to an automatic speech recognition engine to generate a speech recognition output, and
   wherein the searching the interaction for the one or more topics comprises identifying one or more instances of the one or more topics in the speech recognition output.

6. A method for generating a customized coaching session for an agent, the method comprising:
receiving, by a processor, one or more evaluations of interactions involving the agent, each of the evaluations being computed based on an evaluation form and an interaction, the evaluation form comprising a plurality of evaluation questions, the evaluation comprising a plurality of answers corresponding to the evaluation questions, each question comprising a rule associated with one or more topics, each of the topics comprising one or more words or phrases, each answer of the answers being automatically calculated for a corresponding evaluation question of the evaluation questions by:
searching, by the processor, the interaction for the one or more words or phrases of each of the one or more topics of the rule to generate a search result comprising one or more detected topics of the interaction; and
calculating, by the processor, the answer to the evaluation question in accordance with the rule and the one or more detected topics of the interaction;
computing, by the processor, one or more aggregated quality metrics in accordance with the answers of the one or more evaluations;
comparing, by the processor, each of the one or more aggregated quality metrics against corresponding threshold values;
identifying, by the processor, one or more underperforming quality metrics in accordance with the comparisons of the aggregated quality metrics with the threshold values;
generating, by the processor, the customized coaching session in accordance with the identified one or more underperforming quality metrics; and
outputting, by the processor, the customized coaching session,
wherein the method further comprises, for each of the one or more underperforming quality metrics:
identifying portions of the interactions corresponding to the answer corresponding to the evaluation question; and
adding the identified portions to the customized coaching session as examples of prior performance of the agent on the underperforming quality metric.

7. The method of claim 6, further comprising:
identifying one or more previous customized coaching sessions generated for the agent, each comprising a timestamp and one or more coaching session reasons;
grouping the one or more previous customized coaching sessions by coaching session reason;
computing an average interval between coaching sessions having the same coaching session reason; and
scheduling a customized coaching session for the agent in accordance with the computed average interval.

8. A method for automatic monitoring of performance trends based on evaluations of all agents, comprising:
receiving, by a processor, a plurality of evaluations involving a plurality of different agents, each of the evaluations comprising one or more quality metrics;
comparing, by the processor, each of the one or more quality metrics with a corresponding threshold value;
identifying, by the processor, a metric of the one or more quality metrics that fails to meet the corresponding threshold value;
calculating, by the processor, a level of correlation of the metric between agents;

identifying, by the processor, the metric as being an individual metric when the correlation is low;
identifying, by the processor, the metric as being a group metric when the correlation is high;
identifying, by the processor, a process issue corresponding to the metric when substantially all of the agents fail to meet the corresponding threshold value with respect to the metric; and
outputting, by the processor, a classification of the metric in accordance with the individual metric, the group metric, and the process issue.

9. A system comprising:
a processor;
memory storing instructions that, when executed by the processor, cause the processor to:
receive an evaluation form comprising a plurality of evaluation questions;
receive an interaction to be evaluated by the evaluation form;
select an evaluation question of the evaluation form, the evaluation question comprising a rule associated with one or more topics, each of the topics comprising one or more words or phrases;
search the interaction for the one or more topics of the rule by identifying the presence of one or more words or phrases in the interaction that are among the one or more words or phrases of each of the one or more topics of the rule to generate a search result comprising one or more detected topics of the interaction;
calculate an answer to the evaluation question in accordance with the rule and the search result comprising the one or more detected topics of the interaction; and
output the calculated answer to the evaluation question of the evaluation form.

10. The system of claim 9, wherein the memory further stores instructions that, when executed by the processor, cause the processor to:
determine whether the calculated answer triggers a coaching rule of a plurality of coaching rules, the coaching rule corresponding to the evaluation question; and
generate a notification in accordance with the answer to the evaluation question.

11. The system of claim 10, wherein the memory further stores instructions that, when executed by the processor, cause the processor to generate the notification by identifying, based on the calculated answer, a coaching tip from a plurality of coaching tips associated with the coaching rule, and
wherein the notification comprising the coaching tip.

12. The system of claim 10, wherein the memory further stores instructions that, when executed by the processor, cause the processor to generate the notification in real-time during the interaction.

13. The system of claim 9, wherein the interaction is a voice interaction,
wherein the memory further stores instructions that, when executed by the processor, cause the processor to supply the voice interaction to an automatic speech recognition engine to generate a speech recognition output, and
wherein the memory further stores instructions that, when executed by the processor, cause the processor to detect the one or more topics in the interaction by identifying one or more instances of the one or more topics in the speech recognition output.

14. A system comprising:
a processor;
memory storing instructions that, when executed by the processor, cause the processor to generate a customized coaching session for an agent by:
receiving one or more evaluations of interactions involving the agent, each of the evaluations being computed based on an evaluation form and an interaction, the evaluation form comprising a plurality of evaluation questions, the evaluation comprising a plurality of answers corresponding to the evaluation questions, each question comprising a rule associated with one or more topics, each of the topics comprising one or more words or phrases, each answer of the answers being automatically calculated for a corresponding evaluation question of the evaluation questions by:
   searching the interaction for the one or more words or phrases of each of the one or more topics of the rule to generate a search result comprising one or more detected topics of the interaction; and
   calculating the answer to the evaluation question in accordance with the rule and the one or more detected topics of the interaction;
computing one or more aggregated quality metrics in accordance with the answers of the one or more evaluations;
comparing each of the one or more aggregated quality metrics against corresponding threshold values;
identifying one or more underperforming quality metrics in accordance with the comparisons of the aggregated quality metrics with the threshold values;
generating the customized coaching session in accordance with the identified one or more underperforming quality metrics; and
outputting the customized coaching session,
wherein the memory further stores instructions that, when executed by the processor, cause the processor to, for each of the one or more underperforming quality metrics:
   identify portions of the interactions corresponding to the answer corresponding to the evaluation question; and
   add the identified portions to the customized coaching session as examples of prior performance of the agent on the underperforming quality metric.

15. The system of claim 14, wherein the memory further stores instructions that, when executed by the processor, cause the processor to:
identify one or more previous customized coaching sessions generated for the agent, each comprising a timestamp and one or more coaching session reasons;
group the one or more previous customized coaching sessions by coaching session reason;
compute an average interval between coaching sessions having the same coaching session reason; and
schedule a customized coaching session for the agent in accordance with the computed average interval.

16. A system comprising:
a processor;
memory storing instructions that, when executed by the processor, cause the processor to:
receive a plurality of evaluations involving a plurality of different agents, each of the evaluations comprising one or more quality metrics;
compare each of the one or more quality metrics with a corresponding threshold value;
identify a metric of the one or more quality metrics that fails to meet the corresponding threshold value;
calculate a level of correlation of the metric between agents;
identify the metric as being an individual metric when the correlation is low;
identify the metric as being a group metric when the correlation is high;
identify a process issue corresponding to the metric when substantially all of the agents fail to meet the corresponding threshold value with respect to the metric; and
output a classification of the metric in accordance with the individual metric, the group metric, and the process issue.

\* \* \* \* \*